US00RE39802E

(19) United States
(12) Reissued Patent
Hasebe et al.

(10) Patent Number: US RE39,802 E
(45) Date of Reissued Patent: Aug. 28, 2007

(54) STORAGE MEDIUM FOR PREVENTING AN IRREGULAR USE BY A THIRD PARTY

(75) Inventors: Takayuki Hasebe, Kawasaki (JP); Ryota Akiyama, Tokyo (JP); Makoto Yoshioka, Yokohama (JP)

(73) Assignee: Fujitsu Limited, Kanagawa (JP)

(21) Appl. No.: 09/476,319

(22) Filed: Dec. 30, 1999

Related U.S. Patent Documents

Reissue of:
(64) Patent No.: 5,796,824
Issued: Aug. 18, 1998
Appl. No.: 08/603,760
Filed: Feb. 20, 1996

U.S. Applications:

(62) Division of application No. 08/341,176, filed on Nov. 18, 1994, now Pat. No. 5,555,304, which is a division of application No. 08/031,339, filed on Mar. 15, 1993, now Pat. No. 5,392,351.

(30) Foreign Application Priority Data

Mar. 16, 1992 (JP) ..... 4-058048

(51) Int. Cl.
*H04L 9/32* (2006.01)
*G06F 12/22* (2006.01)

(52) U.S. Cl. ..... 713/193; 380/277; 705/51; 705/56

(58) Field of Classification Search ..... 713/193; 380/200–203, 277–278; 705/51–52, 55–59
See application file for complete search history.

(56) References Cited

U.S. PATENT DOCUMENTS

| | | | | |
|---|---|---|---|---|
| 4,577,289 | A | 3/1986 | Comerford et al. | |
| 4,683,553 | A | 7/1987 | Mollier | |
| 4,747,139 | A | 5/1988 | Taaffe | |
| 4,757,534 | A | 7/1988 | Matyas et al. | |
| 4,785,361 | A | 11/1988 | Brotby | |
| 4,827,508 | A | 5/1989 | Shear | 705/53 |
| 4,850,017 | A | 7/1989 | Matyas, Jr. et al. | |
| 4,866,769 | A | 9/1989 | Karp | |
| 5,010,571 | A | 4/1991 | Katznelson | |
| 5,058,162 | A | 10/1991 | Santon et al. | |
| 5,065,429 | A | 11/1991 | Lang | |
| 5,199,066 | A | 3/1993 | Logan | |
| 5,276,735 | A | 1/1994 | Boebert et al. | |
| 5,287,408 | A | 2/1994 | Samson | |
| 5,379,433 | A | 1/1995 | Yamagishi | |

FOREIGN PATENT DOCUMENTS

| | | |
|---|---|---|
| EP | 0 144 522 | 8/1984 |
| EP | 0 268 139 | 5/1988 |
| EP | 0 268 139 A | 5/1988 |
| JP | A-60-175254 | 9/1985 |
| JP | 61-105986 | 7/1986 |
| JP | A-61-204807 | 9/1986 |
| JP | A-62-108629 | 5/1987 |
| JP | A-62-205580 | 9/1987 |
| JP | A-62-226335 | 10/1987 |
| JP | 63-20790 | 1/1988 |
| JP | A-1-177229 | 7/1989 |
| JP | A-1-194029 | 8/1989 |
| JP | B2-2-42261 | 9/1990 |
| JP | 2-287970 | 11/1990 |
| JP | A-3-30020 | 2/1991 |
| JP | A-3-83132 | 4/1991 |
| JP | 3-83132 | 4/1991 |
| WO | 0 191 162 A2 | 8/1986 |
| WO | WO 88/02202 | 3/1988 |

OTHER PUBLICATIONS

Albert et al., Computer, vol. 17, No. 4, Apr. 1984, Long Beach, California, "Combatting Software Piracy by Encryption and Key Management".

*Primary Examiner*—Gilberto Barron, Jr.
(74) *Attorney, Agent, or Firm*—Squire, Sanders & Dempsey L.L.P.

(57) ABSTRACT

A storage medium stores encrypted electronic data, a medium personal number which is unique for each storage medium and encrypted permission information. At least the medium personal number is written onto the storage medium in an un-rewritable form which a user computer cannot rewrite.

65 Claims, 21 Drawing Sheets

START
INPUT SOFTWARE NAME
LOAD SOFTWARE DECRYPTING KEY FROM DECRYPTING KEY MANAGEMENT TABLE
LOAD MEDIUM NUMBER
GENERATE MEDIUM KEY
ENCRYPT SOFTWARE DECRYPTING KEY BY MEDIUM KEY
STORE PERMISSION INFORMATION
END
S11
S12
S13
S14
S15
S16

START
INPUT SOFTWARE EXECUTION INSTRUCTION
LOAD MEDIUM NUMBER
GENERATE MEDIUM KEY
DECRYPT PERMISSION INFORMATION BY MEDIUM KEY
READ ENCRYPTED SOFTWARE
DECRYPT ENCRYPTED SOFTWARE BY SOFTWARE DECRYPTING KEY, AND GENERATE PLAIN TEXT SOFTWARE
EXECUTE SOFTWARE
END
S21
S22
S23
S24
S25
S26
S27

STORAGE MEDIUM FOR PREVENTING AN IRREGULAR USE BY A THIRD PARTY

Matter enclosed in heavy brackets [ ] appears in the original patent but forms no part of this reissue specification; matter printed in italics indicates the additions made by reissue.

This is a division of application Ser. No. 08/341,176 filed on Nov. 18, 1994, now U.S. Pat. No. 5,555,304 which is a divisional of application Ser. No. 08/031,339 filed on Mar. 15, 1993 now U.S. Pat. No. 5,392,351.

BACKGROUND OF THE INVENTION

1. Field of the Invention

The present invention relates to an electronic data protection system, and more particularly, it relates to an electronic data protection system for protecting electronic data, for example, software used for a computer and data published electronically, from being illegally copied by a third party.

2. Description of the Related Art

Recently, various computers, electronic publishing and the like, which utilize electronic data, are widely used in various fields. In general, software and electronic data are protected by copyright is various countries.

However, it is relatively easy for a third party to illegally copy electronic data suffers significant damage in that he cannot derive legitimate benefits. As a result of this damage, the cost of electronic data, i.e., the software and electronically published data rises so that users also suffer due to increased prices.

Accordingly, it is necessary to provide a protection system for electronic data, such as software and electronically published data, in addition to protection by means of copyright.

SUMMARY OF THE INVENTION

The object of the present invention is to provide an electronic data protection system enabling certain protection of electronic data, such as software used for a computer and electronically published data from illegal copying by a third party.

In accordance with the present invention, there is provided an electronic data protection system for protecting electronic data from illegal copying by a third party, the system including:

a storage medium for storing an encrypted electronic data, a medium number and as encrypted permission information; a vendor computer having a personal key generating unit for generating a medium key based on the medium number, an electronic data decrypting key, and an encrypting unit for encrypting the electronic data decrypting key based on the medium key to generate the encrypted permission information; and a user computer having a personal key generating unit for generating a medium key based on the medium number, a decrypting unit for decrypting the encrypted permission information based on the medium key to generate an electronic data decrypting key which is the same as the electronic data decrypting key of the vendor computer, and a decrypting unit for decrypting the encrypted electronic data based on the electronic data decrypting key to generate plain text (unencrypted) electronic data.

In a preferred embodiment, the electronic data is software used in a computer.

In another preferred embodiment, the electronic data is electronically published data.

In still another preferred embodiment, the storage medium stores a plurality of encrypted electronic data, and each encrypted electronic data has a different electronic data decrypting key; the vendor computer encrypts only an electronic decrypting key for the encrypted electronic data permitted by a vendor by using the medium key, and stores the encrypted electronic data key on the storage medium as the encrypted permission information; and the user computer decrypts the encrypted electronic data corresponding to the encrypted permission information.

In still another preferred embodiment, the vendor computer writes the medium number on the storage medium is an un-writable form which the user computer cannot rewrite.

In still another preferred embodiment, the vendor computer stores the encrypted permission information on a different storage medium, and the different storage medium is supplied for use with the user computer.

In still another preferred embodiment, the vendor computer transfers the encrypted permission information to the user computer through a transmission line, and the user computer decrypts the encrypted electronic data from the storage medium based on the encrypted permission information.

In still another preferred embodiment, the vendor computer sends the encrypted permission information to the user in a document, and the user computer decrypts the encrypted electronic data from the storage medium based on the encrypted permission information described in the document.

In still another preferred embodiment, the storage medium is an optical magnetic disk, or a partially embossed optical disk.

In still another preferred embodiment, the vendor computer further comprises a software encrypting key management table including software names and encrypting keys corresponding to respective software names.

In still another preferred embodiment, the user computer further comprises a software decrypting key management table including software names and decrypting keys corresponding to respective software names.

DESCRIPTION OF THE PREFERRED EMBODIMENTS

Before describing the preferred embodiments, a conventional art and its problems will be explained below.

Figure 1:
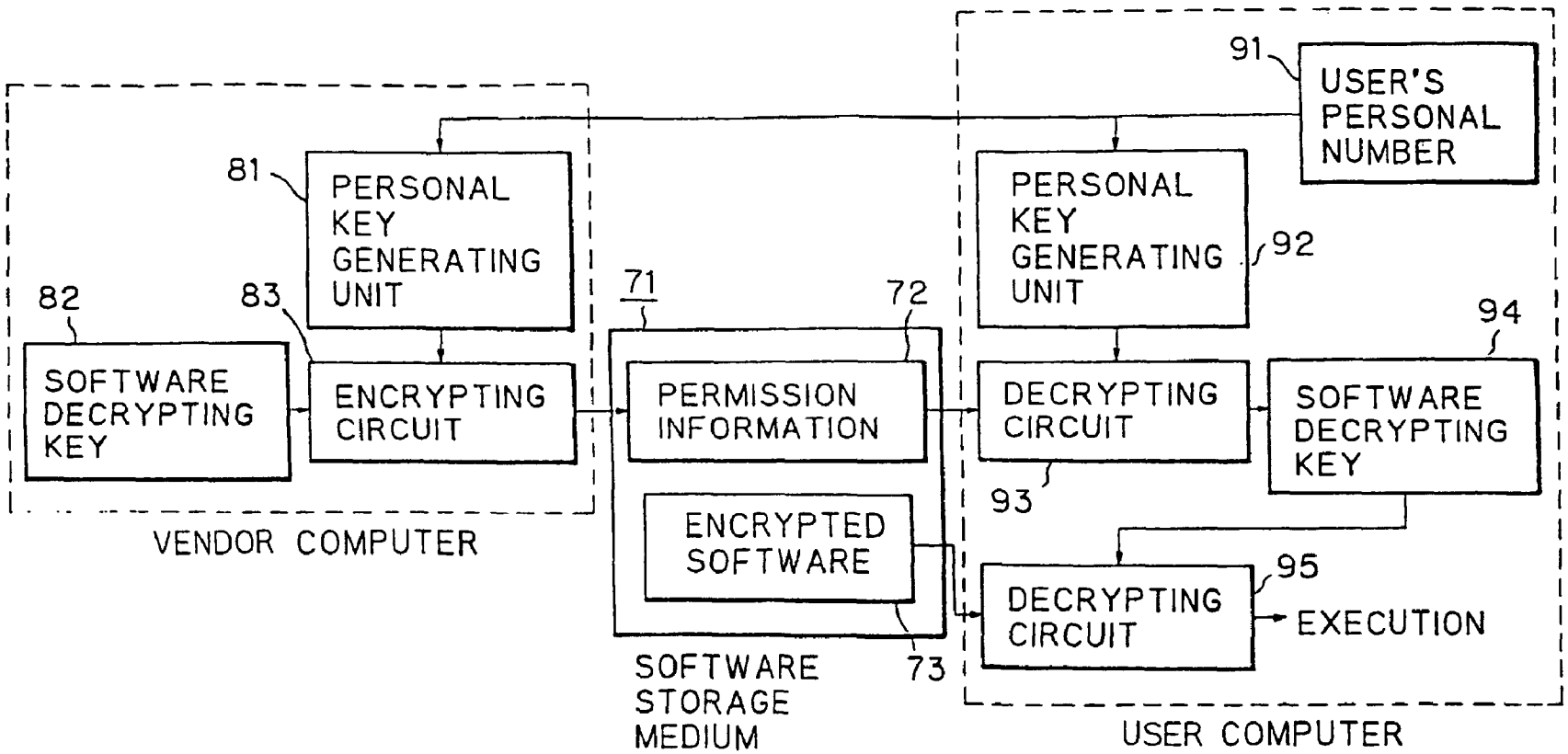
Fig. 1 PRIOR ART
FIG. 1 is a schematic block diagram of a conventional electronic data protection system.

FIG. 1 is a schematic block diagram of a conventional electronic data protection system, particularly, a software protection system. The feature of the conventional software protection system lies in generation of permission information 72 by using a user's personal number 91 as explained in detail below.

As shown in the drawing, a software storage medium 71, for example, an optical magnetic disk, a CD-ROM, a floppy disk and the like, is provided by a vendor to a user. That is, the vendor provides the software storage medium 71 storing the software to the user. The software storage medium 71 includes the permission information 72 and encrypted software 73. The vendor computer includes a personal key generating unit 81, a software decrypting key 82 and an encrypting circuit 83. Further, the user computer includes the user's personal number 91, a personal key generating unit 92, a decrypting circuit 93, a software decrypting key 94, and a decrypting circuit 95.

The software is stored in the software storage medium 71 after encryption. A user's personal key is generated by using the user's personal number 91, and the software decrypting key 82 is decrypted by the user's personal key so that the encrypting circuit 83 encrypts the software decrypting key 82 to generate the permission information. The permission information is stored on the software storage medium 71.

The user buys the software storage medium 71 including the permission information 72 and the encrypted software 73, and the user computer decrypts the encrypted software 73 so that it is possible to execute the unencrypted program.

In the vendor computer, the personal key generating unit 81 generates the personal key based on the user's personal number 91, for example, an apparatus number of a computer. The software decrypting key 82 decrypts the encrypted software 73. The encrypting circuit 83 generates the permission information 72 for storage on the software storage medium 71.

In the user computer, the personal key generating unit 92 receives the user's personal number 91 and generates the user's personal key. The decrypting circuit 93 decrypts the permission information 72 from the software storage medium 71 based on the personal key 81. The software decrypting key 94 is input to the decrypting circuit 95, the decrypting circuit 95 decrypts the encrypting software 73 to generate the plate text software. As a result, the plain text software is loaded into a main storage of the user computer.

An explained above, the conventional software protection system utilizes a user's personal number (or, an apparatus number of a computer) and a personal key.

In use of the personal number for the computer, the execution for the computer is applied by the permission information 72 so that only that computer can execute the plain text software. Accordingly, the user cannot utilize a different computer even if he is authorized. Further, it is impossible to transfer such plain text software to a third party.

In use of the personal number for portable hardware, it is necessary to provide an interface between the hardware and the computer so that the total cost for protection rises.

As a feature of the present invention, a storage medium for storing electronic data includes a medium number. A vendor authorizes use of the medium number. According to the present invention, it is possible to access only electronic data stored on the medium authorized by the vendor.

Figure 2:
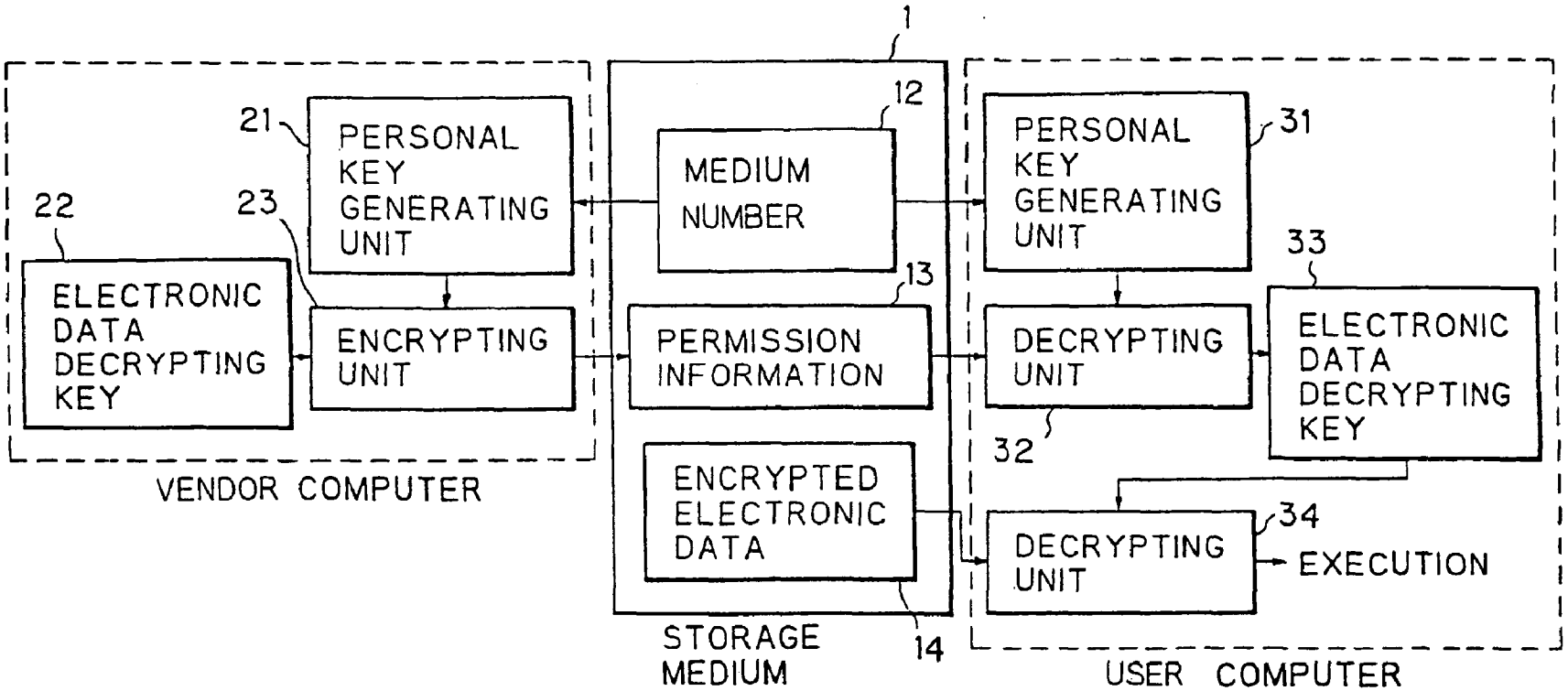
FIG. 2 is a principal view of the present invention.

FIG. 2 is a principal view of the present invention. In FIG. 2, the storage medium 1 includes a medium number (or medium personal number) 12, permission information 13, and encrypted electronic data 14. In the present invention, the electronic data includes computer software and electronically published data, as explained below. The vendor computer includes a medium personal key generating unit 21, an electronic data decrypting key 22, and a decrypting unit 23. The user computer includes a medium personal key generating unit 31, a decrypting unit 32, an electronic data decrypting key 33, and a decrypting unit 34.

The personal key generating unit 21 and 31 generate a medium key based on the medium number 12. The encrypting unit 23 encrypts the electronic data decrypting key 22 based on the medium key.

The decrypting unit 32 decrypts the permission information 13 based on the medium key, and generates the electronic data decrypting key 33. Further, the decrypting unit 34 decrypts the encrypted electronic data 14 based on the electronic data decrypting key 33, and generates the plain text electronic data.

In the present invention, briefly, only the medium number 13 and the encrypted electronic data 14 are previously stored in the storage medium 1.

In the vendor computer, the personal key generating unit 21 generates the medium key based on the medium number, the encrypting unit 23 encrypts the electronic data decrypting key 22 based on the medium key, and the encrypting unit 23 writes the encrypted data onto the storage medium 1 as the permission information 13.

In the user computer, the personal key generating unit 31 generates the medium key based on the medium number 12 of the storage medium 1, the decrypting unit 32 decrypts the permission information 13 based on the personal key, and generates an original electronic data decrypting key 33, and decrypting unit 34 decrypts the encrypted electronic data 14 based on the original electronic data decrypting key 33, and provides the plain text electronic data.

Further, a different electronic data decrypting key 22 is provided for every encrypted electronic data 14. Only the electronic data decrypting key 22 of the encrypted electronic data 14. In which the use is permitted in the vendor computer, is encrypted by the medium key, and stored on the storage medium 1 as the permission information 13. Further, only the encrypted electronic data corresponding to this permission information 13 stored on the storage medium 1 is decrypted in the user computer to provide the plain text electronic data.

Still further, only the medium number 12 may be written onto the storage medium 1 in the un-rewritable form by the user computer. Still further, only the permission information 13 may be stored on another medium, for example, a floppy disk, by the vendor computer, and be provided for use in the user computer. Still further, the vendor may transfer the permission information 13 to the user computer through a transmission line, so the user computer can decrypt the encrypted electronic data 14 based on the permission information 13 to provide the plain text electronic data.

In this case, as the encrypted electronic data 14, there are software for operating various computers, or various types of data (character data, image data, sound data), and these are encrypted to protect content thereof. Accordingly, since the medium 1 storing the encrypted electronic data 14 includes the medium number in the un-rewritable form, the vendor computer allows use of the electronic data having the medium number. Accordingly, it is possible to use only the encrypted electronic data 14 stored on the correct medium 1 and authorized by the vendor. As a result, it is possible to transfer the stored electronic data to another user so that it is possible to use this medium 1 in another computer.

FIGS. 3 to 14 are explanatory views for embodiments of the present invention. As one example of electronic data shown in FIG. 2, an explanation is given next for software used for a computer.

Figure 3:
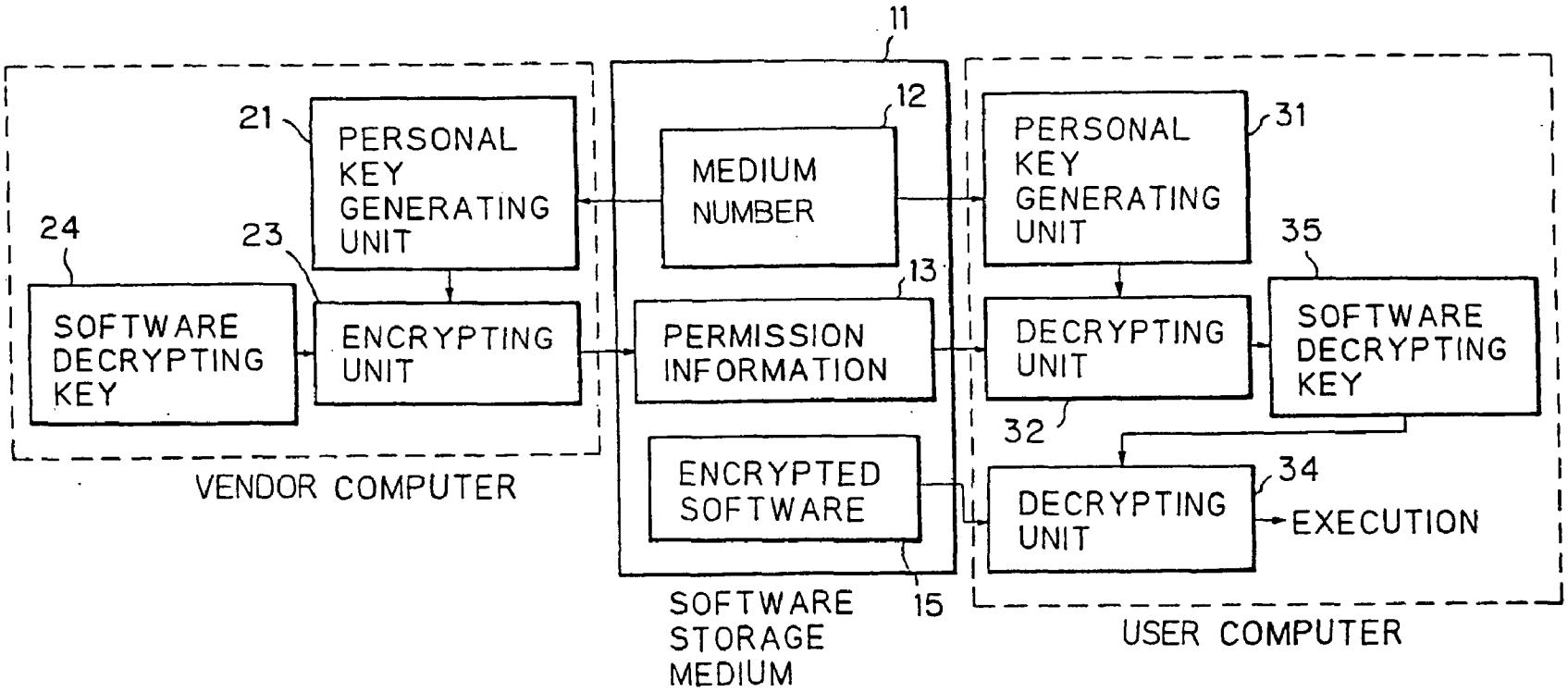
FIG. 3 shows one embodiment of the present invention.

FIG. 3 shows one embodiment of the present invention. In FIG. 3, the software storage medium 11, for example, an optical magnetic disk (particularly, a disk having a capacity in the range of several hundred M-byte to several G-byte), is a medium for storing software authorized by a vendor for use by a user. The software storage medium 11 stores the medium number 12 in an un-rewritable form, the permission information 13 granting permission for use of the software to the user, and the encrypted software 15.

The medium number 12 is a particular personal number for the medium 11, and this medium number cannot be rewritten (i.e., is un-rewritable) by the user. That is, this medium number 12 is written into an area which the user cannot rewrite. This area can be managed in various forms. For example, this area may be managed by an Operating System (OS). Further, it may be possible to arranged that this area cannot be rewritten by means of the Operating System.

The permission information 13 is provided from the vendor to the user to permit use of the software. In this case, this permission information 13 incorporates encrypted data for decrypting the encrypted software 15 (see, FIGS. 7 and 8). The encrypted software 15 is shown in FIGS. 4 to 6.

The vendor computer includes the personal key generating unit 21, the software decrypting key 24, and the encrypting unit 23. The personal key generating unit 21 generates the medium key based on the medium number 12 read from the software storage medium 11 (see, FIG. 7). The encrypting unit 23 encrypts the software decrypting key 24 based on the medium key generated by the personal key generating unit 31. The data encrypted by the encrypting unit 23 is stored in the software storage medium 11 as the permission information 13.

The user computer includes the personal key generating unit 31, the decrypting unit 32, the software decrypting key 35, and the decrypting unit 34. The personal key generating unit 31 generates the medium key based on the medium number 12 read from the software storage medium 11 (see, FIG. 7). The decrypting unit 32 decrypts the permission information 13 read from the software storage medium 11 based on the medium key generated by the personal key generating unit 31, and generates the software decrypting key 35 (see, FIG. 9). The decrypting unit 34 decrypts the encrypted software 15 read from the software storage medium 11 based on the software decrypting key 35, and generates the plain text software (see, FIG. 9). The user computer then executes the plain text software.

Figure 4:
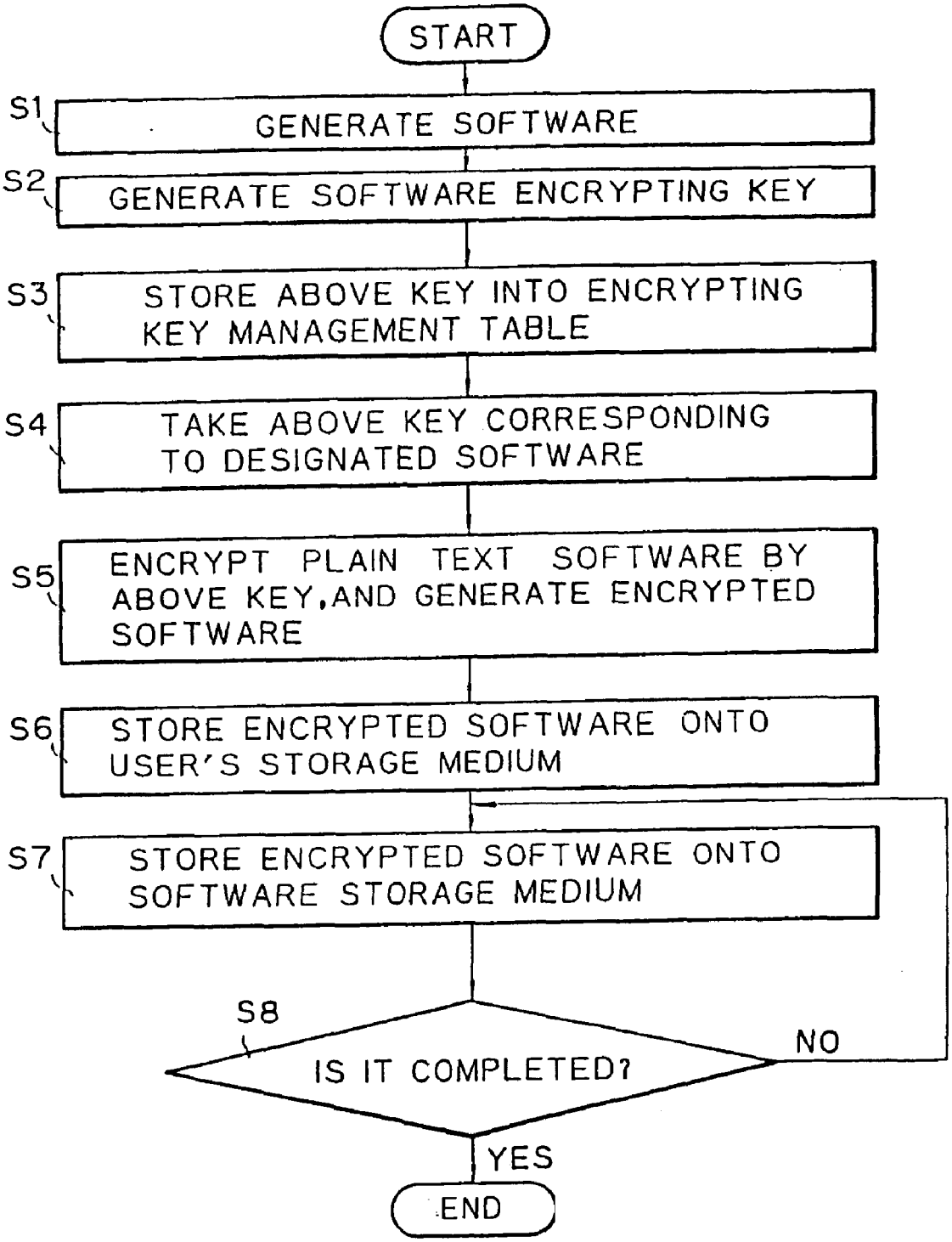
FIG. 4 is a flowchart of a storage process of software according to the present invention.

FIG. 4 is a flowchart of a storage process of the software according to the present invention. This flowchart shows the storage process of the encrypted software 15 and the encrypted permission information 13. In step S1, the vendor generates the software, for example, a job program, etc., and stores the generated software onto the software storage medium. In step S2, the vendor generates the software encrypting key. In step S3, the software encrypting key is stored in an encrypting key management table (see, FIG. 6) corresponding to each software. That is, the encrypting key generated by step S2 is stored in the encrypting key management table in correspondence with the name of the software generated by step S1.

In step S4, the software encrypting key corresponding to the software designated by the vendor is taken from the encrypting key management table. In step S5, the vendor encrypts the plain text software by using the software encrypting key taken from the encrypting key management table to generate the encrypted software. As shown in FIG. 5, a main body of the software is encrypted by the encrypting key so as to generate the encrypted software body by using, for example, a data encryption standard (DES) which is widely used in the United States. As shown in FIG. 5B, in the DES, the main body of the software having 64-bit train is encrypted to the same 64-bit train, but having a different bit order.

In step S6, the encrypted software is stored in the storage medium of the vendor (or, a manufacturer of the medium) so that it is possible to hold the once encrypted software. Accordingly, in a subsequent use of the software, the encrypting process can be omitted by the vendor since the software held on the medium is used again. In step S7, the encrypted software is stored on the software storage medium 11. In step S8, the vendor determines whether or not the encrypting process for the software is completed and the encrypted software is stored on the storage medium. When the result is "YES", the encrypting process is completed by the vendor.

When the result is "NO", the encrypting process returns to the step S7 and sequentially stores the encrypted software having the name of the software designated. As explained above, the encrypted software is stored on the software storage medium 11.

Figure 5A:
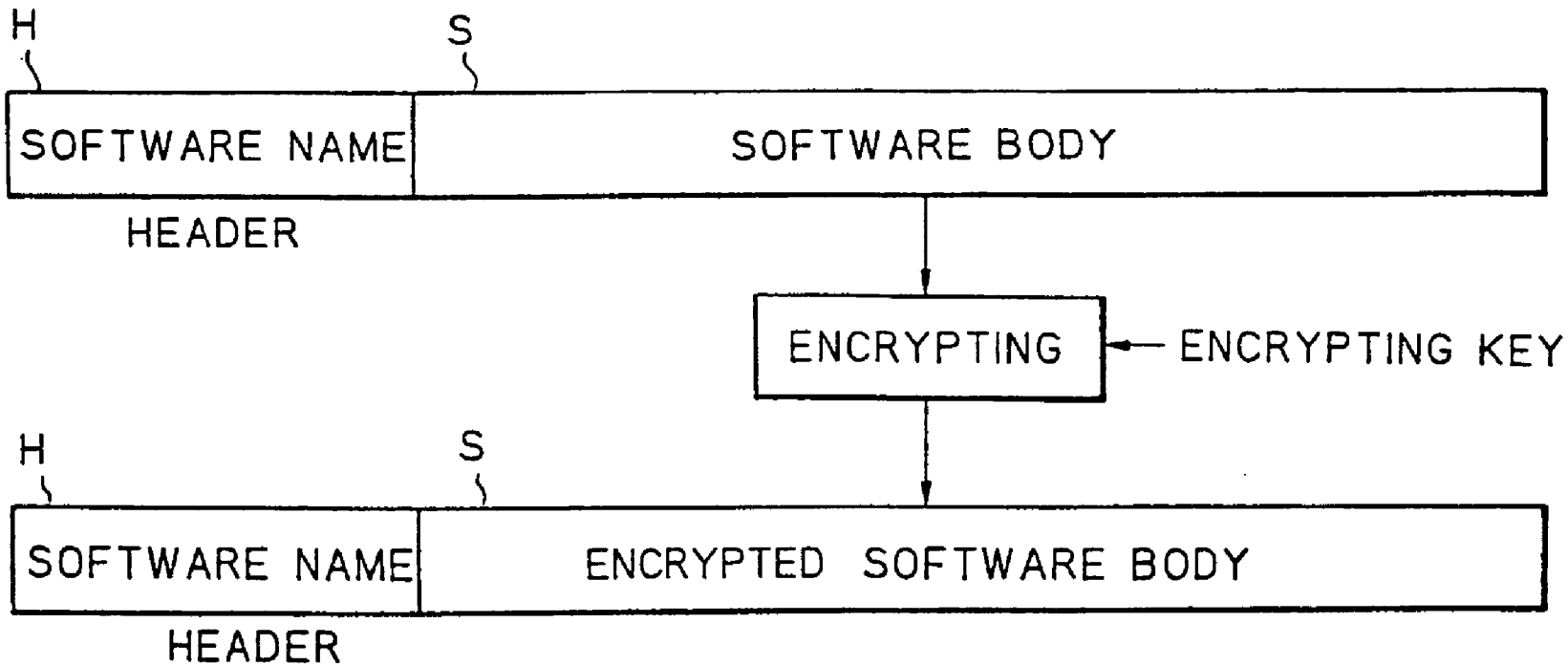
FIGS. 5A and 5B are explanatory views for one example of the encrypting process.
Figure 5B:
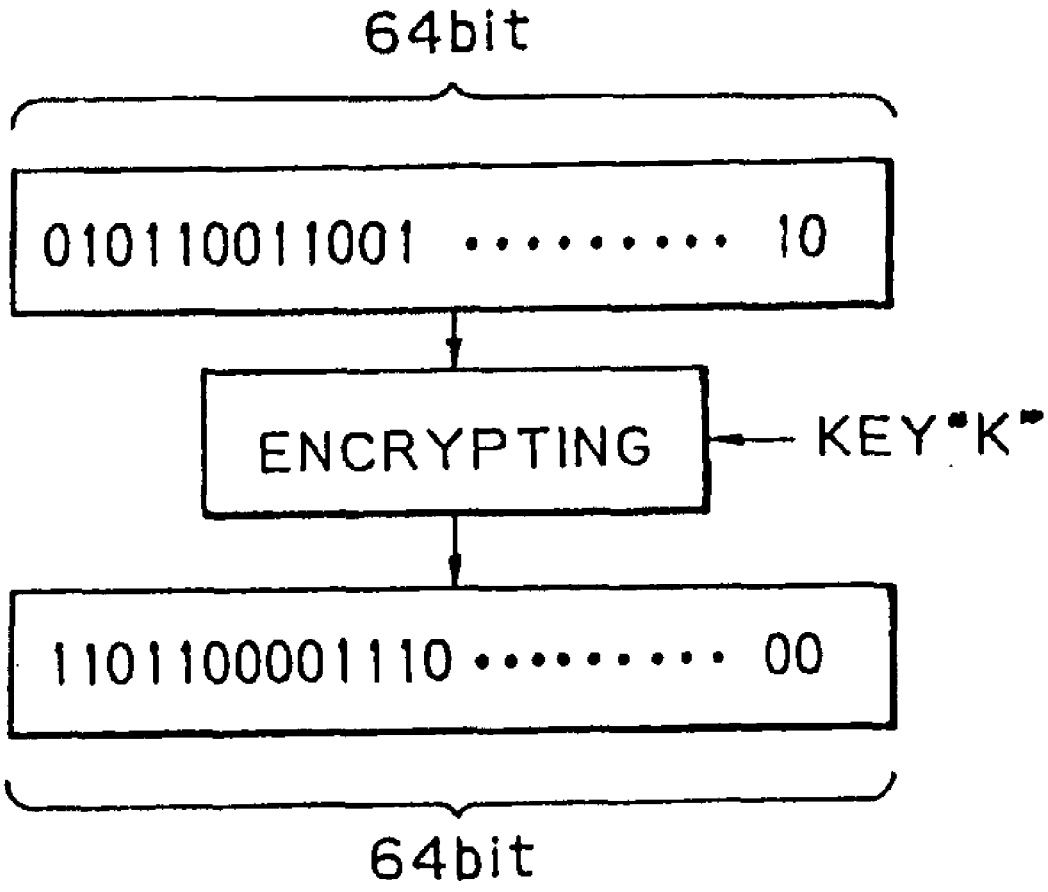
Figure 6:
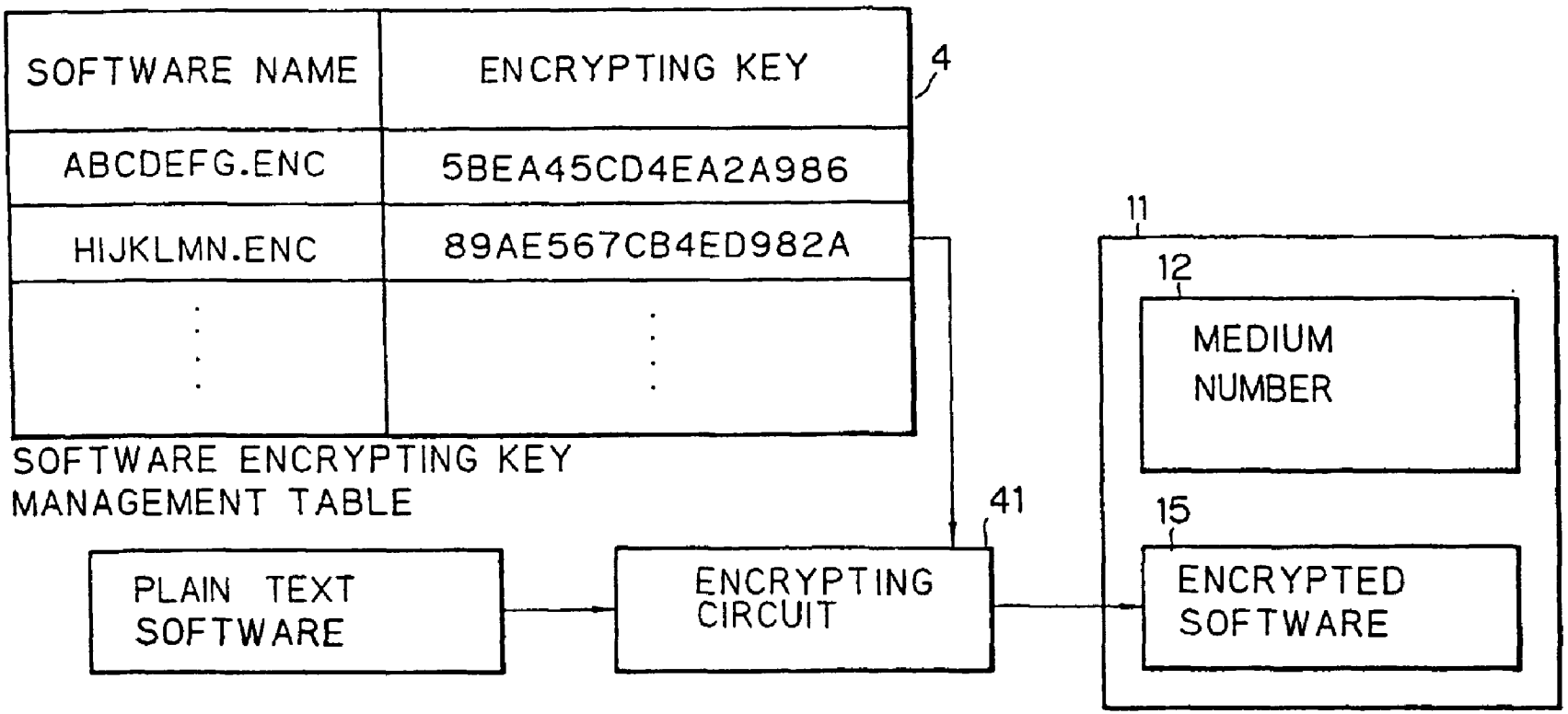
FIG. 6 shows a software encrypting key management table according to an embodiment of the present invention.

FIGS. 5A and 5B are explanatory views of one example of the encrypting process. A header portion H includes a software name as an identifier, and a main body of the software S includes the plain text software. The header portion H is not encrypted, and the main body of the software S is encrypted by the encrypting key K. The encryption is performed, for example, using the DES (Data Encryption Standard) as shown in FIG. 5B. The DES is already known in the United States.

As shown in FIG. 5B, according to the encrypting process of the DES, the 64-bit bit train of the plain text software is converted to the same 64-bit train as above, but having a different bit order. The decrypting unit decrypts the encrypted 64-bit train to the plain text software by using the DES.

FIG. 6 shows a software encrypting key management table according to an embodiment of the present invention. As shown in the drawing, the software encrypting key management table 4 is formed by the same of the software and the encrypting key corresponding to the name of the software. An escape character "ENC" is attached to each software name to indicate that the corresponding software is already encrypted. Further, the encrypted key is formed by a 64-bit bit train as explained above.

(1) Regarding the plain text software to be stored onto the storage medium, the software encrypting key is taken from the software encrypting key management table.

(2) The encrypting circuit 41 encrypts the plain text software based on the software encrypting key obtained by the above (1).

(3) The encrypted software is stored on the software storage medium 11 as the encrypted software 15.

The above steps are repeated for all plain text software designated by the vendor. As explained above, since once encrypted software is held by the vendor, this encrypted software is stored again on the software storage medium when another user requests this plain text software. The medium number 12 is provided for only the corresponding storage medium, and is written onto the medium 11 in an un-rewritable form (i.e., the medium personal number cannot be rewritten).

Further, the encrypting key stored in the software encrypting key management table 4 colacides with the decrypting key when using an object key number as an encrypting algorithm. As explained above, the software encrypting key corresponding to the plain text software is taken from the software encrypting key management table, the plain text software is encrypted by the software encrypting key to generate the encrypted software, and the encrypting software is stored in the software storage medium 11.

Figures 7, 7A, 7B:
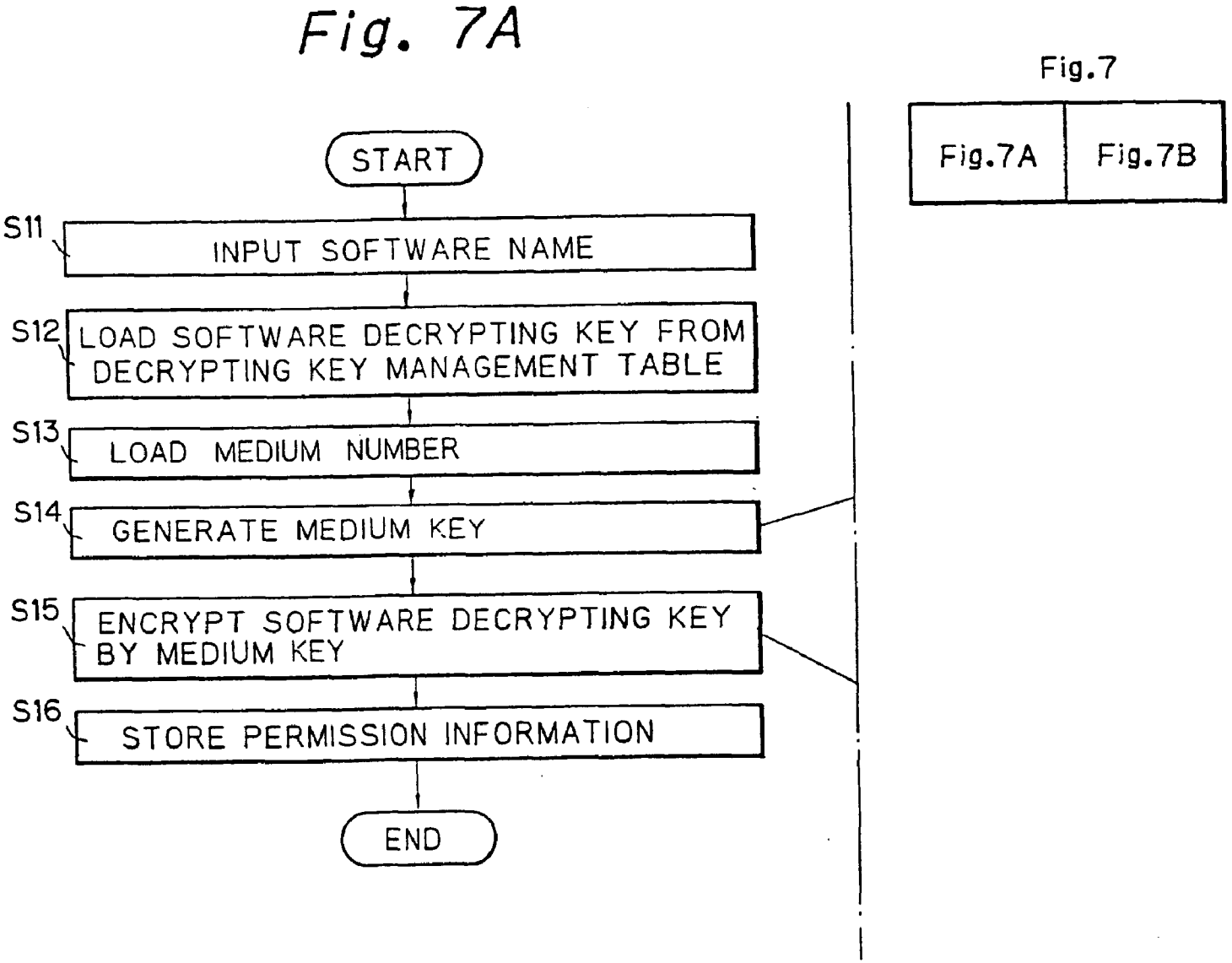
FIGS. 7, 7A and 7B are flowcharts for generating permission information.
Figure 7B:
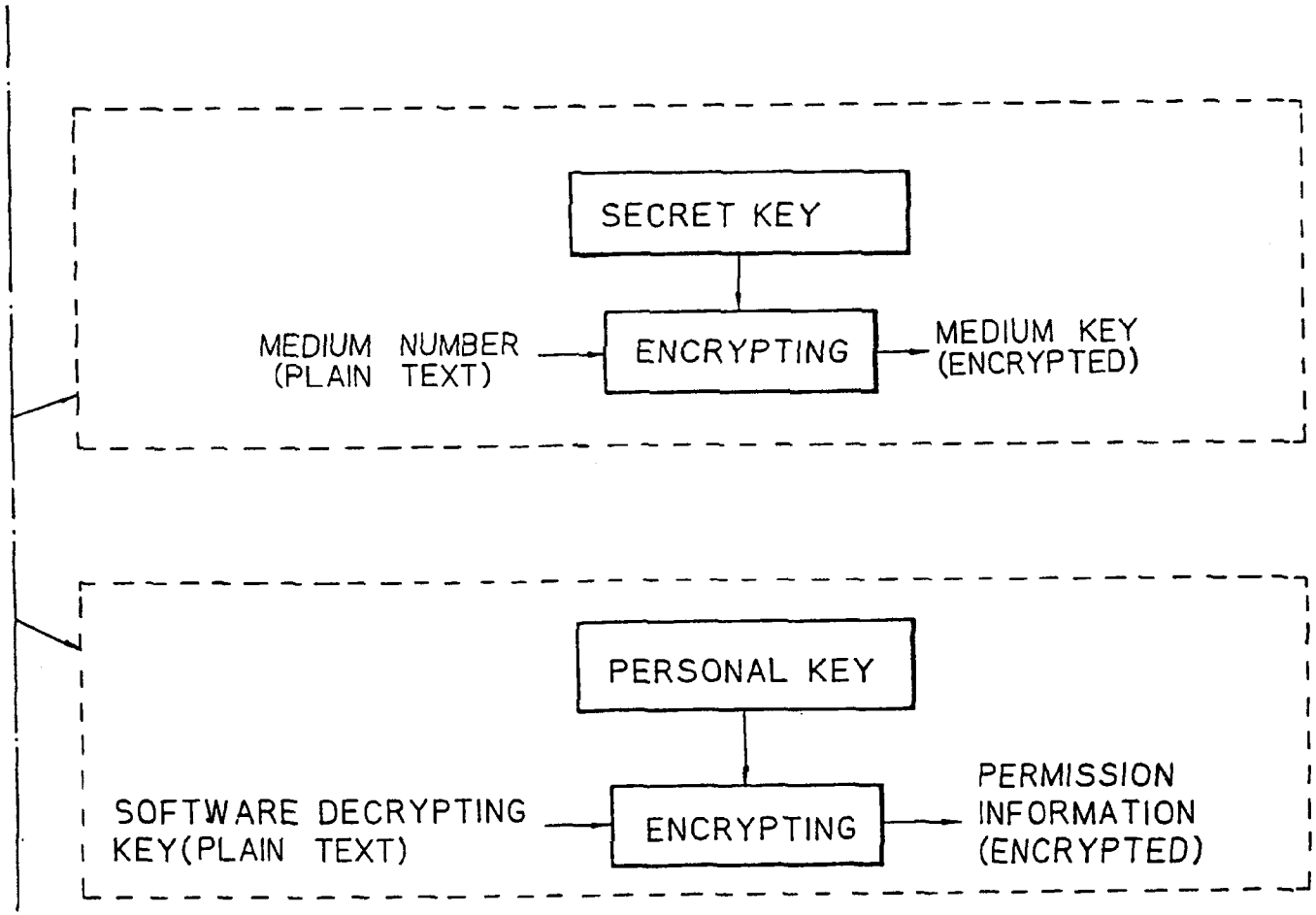
Figure 8:
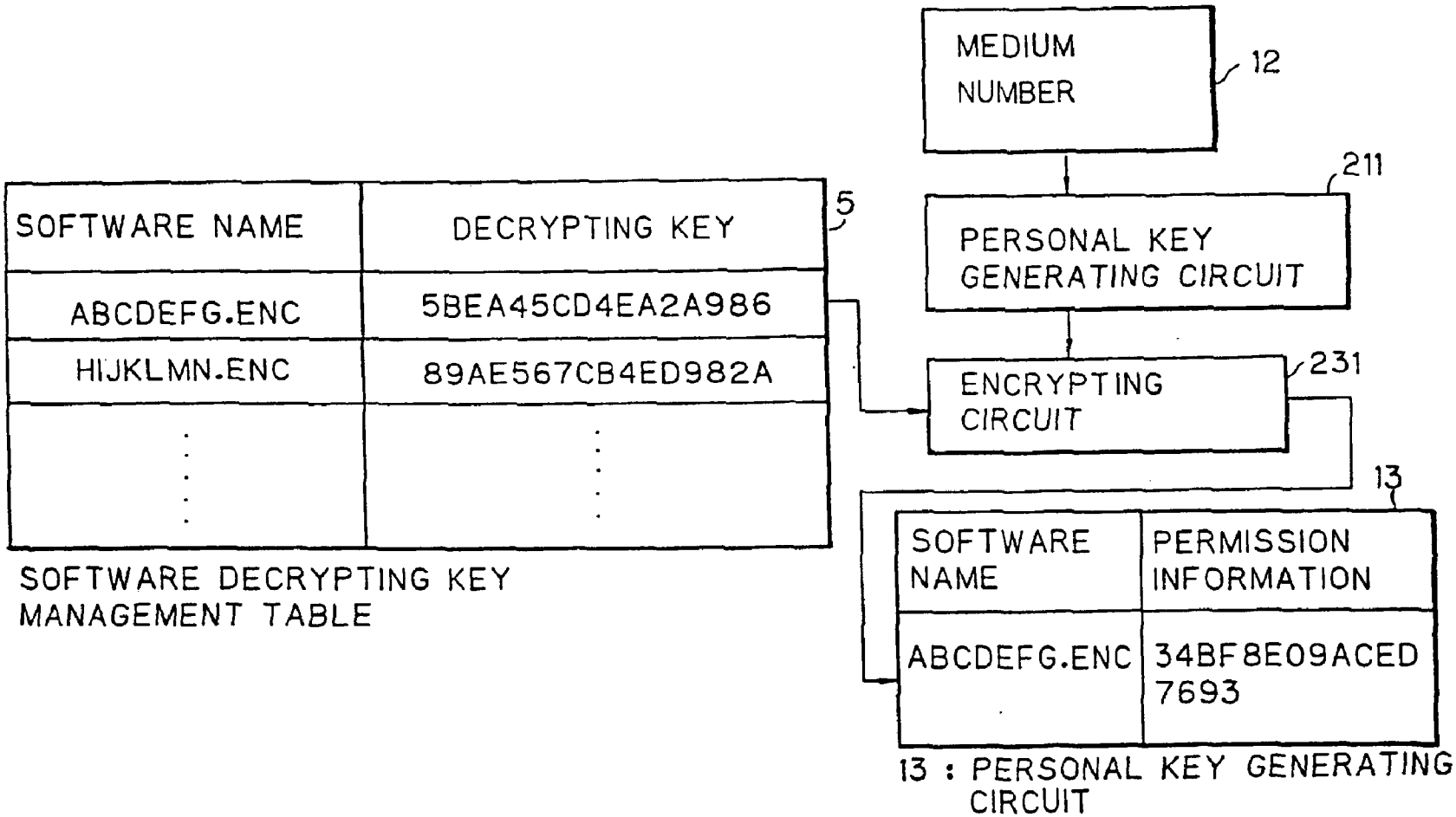
FIG. 8 is an explanatory view of generation of the permission information.

FIGS. 7A and 7B are flowcharts for generating permission information, and FIG. 8 is an explanatory view of generation of the permission information. The flowchart explains that the permission information 13 is generated for the software to be authorized and stored on the software storage medium.

In step S11, the name of the software to be authorized is input to the software decrypting key management table 5. In step S12, the software decrypting key is loaded from the software decrypting key management table 5. As shown in FIG. 8, the decrypting key corresponding to the name of the software to be authorized is sent from the software decrypting key management table 5 to the encrypting circuit 33.

In step S13, the medium number 12 is loaded from the software storage medium 11. In step S14, the medium key is generated in the personal key generating circuit 211. That is, as shown in FIG. 7B, the medium number (plain text, i.e., unencrypted) is encrypted by a secret key (or, a secret algorithm) so that the medium key (encrypted) is generated. In general, in use of the DES, a secret key is used, and in use of a secret algorithm, the secret key in not used.

In step S15, the software decrypting key (plain text, i.e., unencrypted) is encrypted by the medium key so that the permission information (encrypted) is generated. The DES is used for the above encrypting process. In step S16, the permission information encrypted by the step S15 is stored in the software storage medium 11.

As explained above, briefly, the encrypted software is stored on the software storage medium 11, the medium key 12 is read therefrom, the software decrypting key is encrypted by the medium key to generate the encrypted permission information 13, and the encrypted permission information 13 is stored on the software storage medium 11. Accordingly, the encrypted software 1 and the encrypted permission information 13 are stored on the software storage medium 11.

In FIG. 8, the software decrypting key management table 5 is provided for massaging the software decrypting key which is used when the encrypted software 15 is decrypted to derive the plain text software. The software decrypting key is managed in correspondence with the software name. The software decrypting key management table 5 stores the decrypting key having the same structure as the software encrypting key management table 4.

(1) When the vendor sells permission information to a user, the medium number 12 is read from the software storage medium 11. The personal key generating circuit 211 receives this medium number and generates the medium key (see, step S14 of FIG. 7A).

(2) Next, the software decrypting key corresponding to the software to be sold is taken from the software decrypting key management table 5, and this key is input to the encrypting circuit 231. This software decrypting key is encrypted by the personal key in the encrypting circuit 231 so that the encrypting circuit 231 generates the permission information 13. The permission information 13 includes the software name having the escape character ENC and the encrypted permission information, and this permission information 13 is stored on the software storage medium 11. In this case, the software decrypting key and the algorithm (or, the secret key) are protected by a known safety means (not shown).

As explained above, the vendor generates the medium key based on the medium number 12 read from the software storage medium 11, encrypts the software decrypting key based on the medium key, and stores this software decrypted key into the software storage medium 11 as the permission information 13.

Figures 9, 9A, 9B:
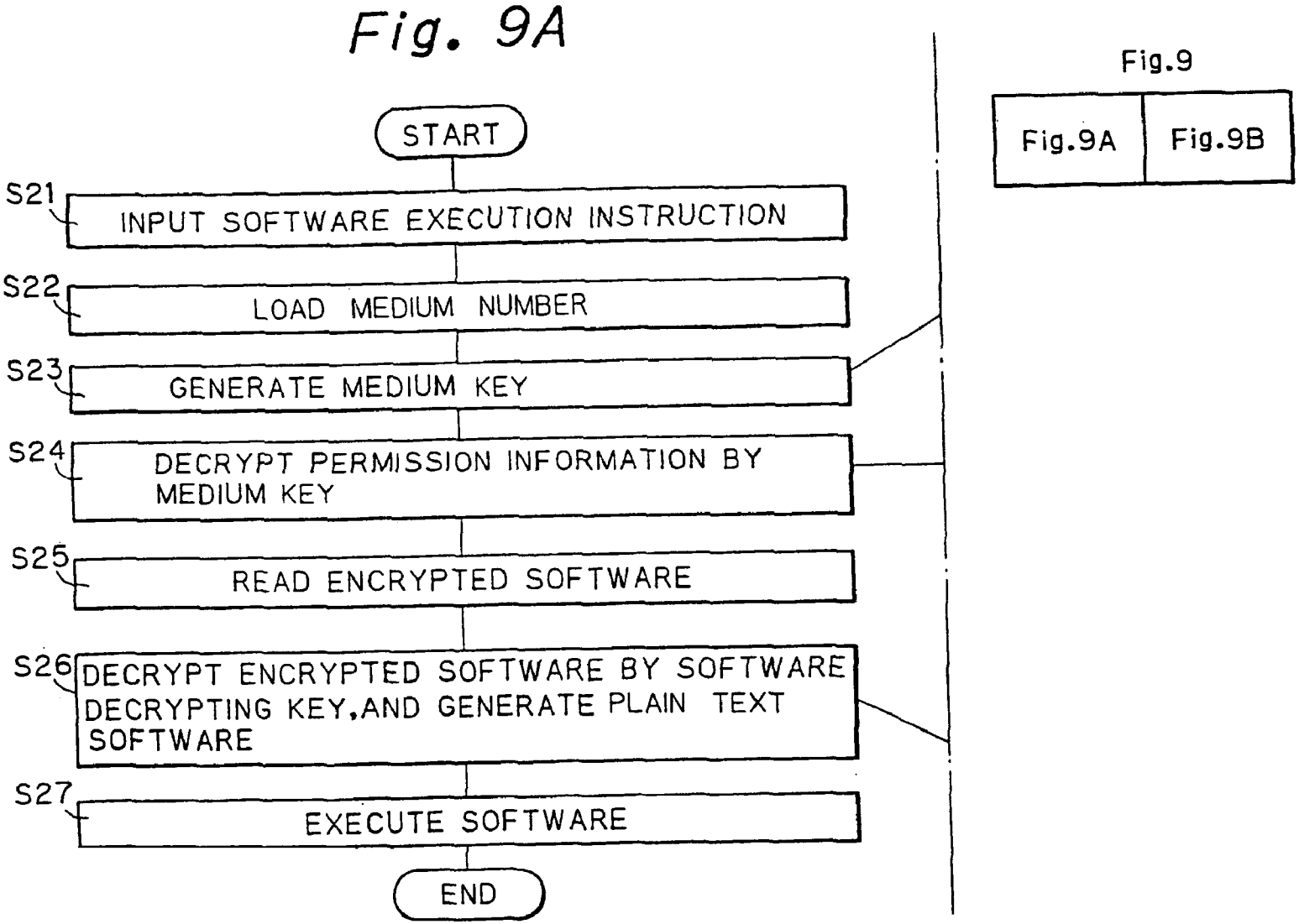
FIGS. 9, 9A and 9B are flowcharts for a decrypting process of software.
Figure 9B:
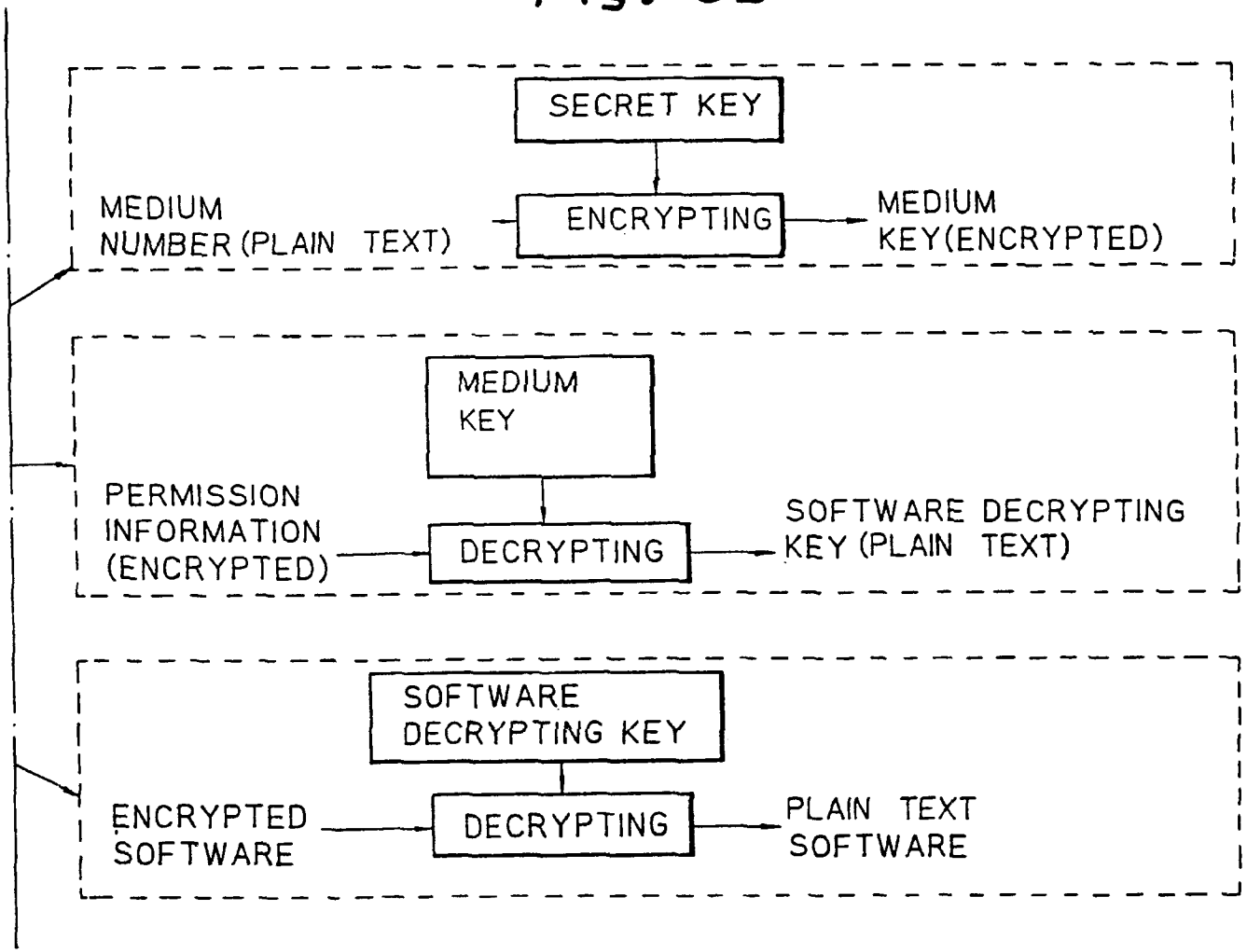

FIGS. 9A and 9B are a flowcharts of a decrypting process of the software. The user buys the software storage medium 11 and mounts it in the user computer. The software of the storage medium 11 is loaded into a main memory to execute the program.

In step S21, the user computer receives an instruction to execute the software. In step S22, the medium number 12 is taken from the software storage medium 11. In step S23, the medium key (unencrypted) is encrypted by the secret key (or, the algorithm) to generate the encrypted medium key. In step S24, the encrypted permission information is decrypted by th medium key so that the plain text software decrypting key is generated.

In step S25, the encrypted software 15 is read from the software storage medium 11. In step S26, the encrypted software is decrypted by the software decrypting key so that the plain text software is generated. In step S27, the user computer executes the plain text software.

As explained above, briefly, the medium key is generated based on the medium key 12 from the software storage medium 11, the permission information 13 is decrypted based on the medium key to generate the software decrypting key 35, and the encrypted software is decrypted by the software decrypting key 35 to generate the plain text software.

Figure 10A:
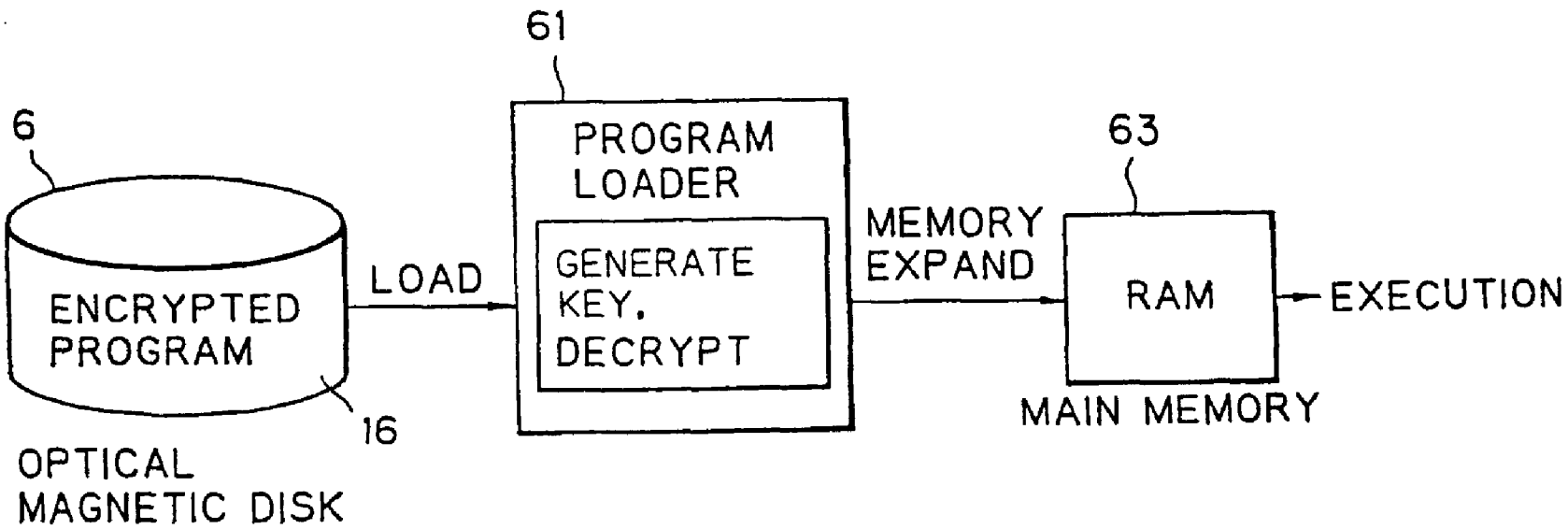
FIGS. 10A, 10B, and 10C are explanatory views of a program as electronic data.
Figure 10B:
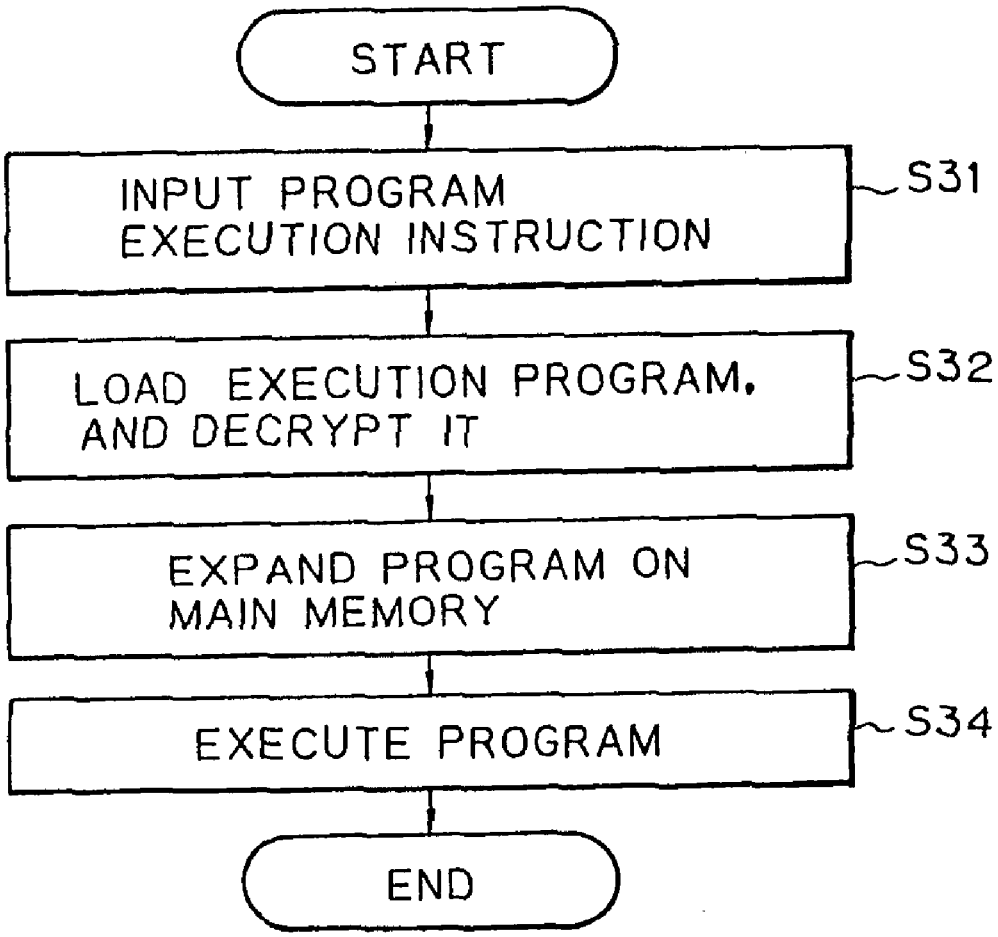
Figure 10C:
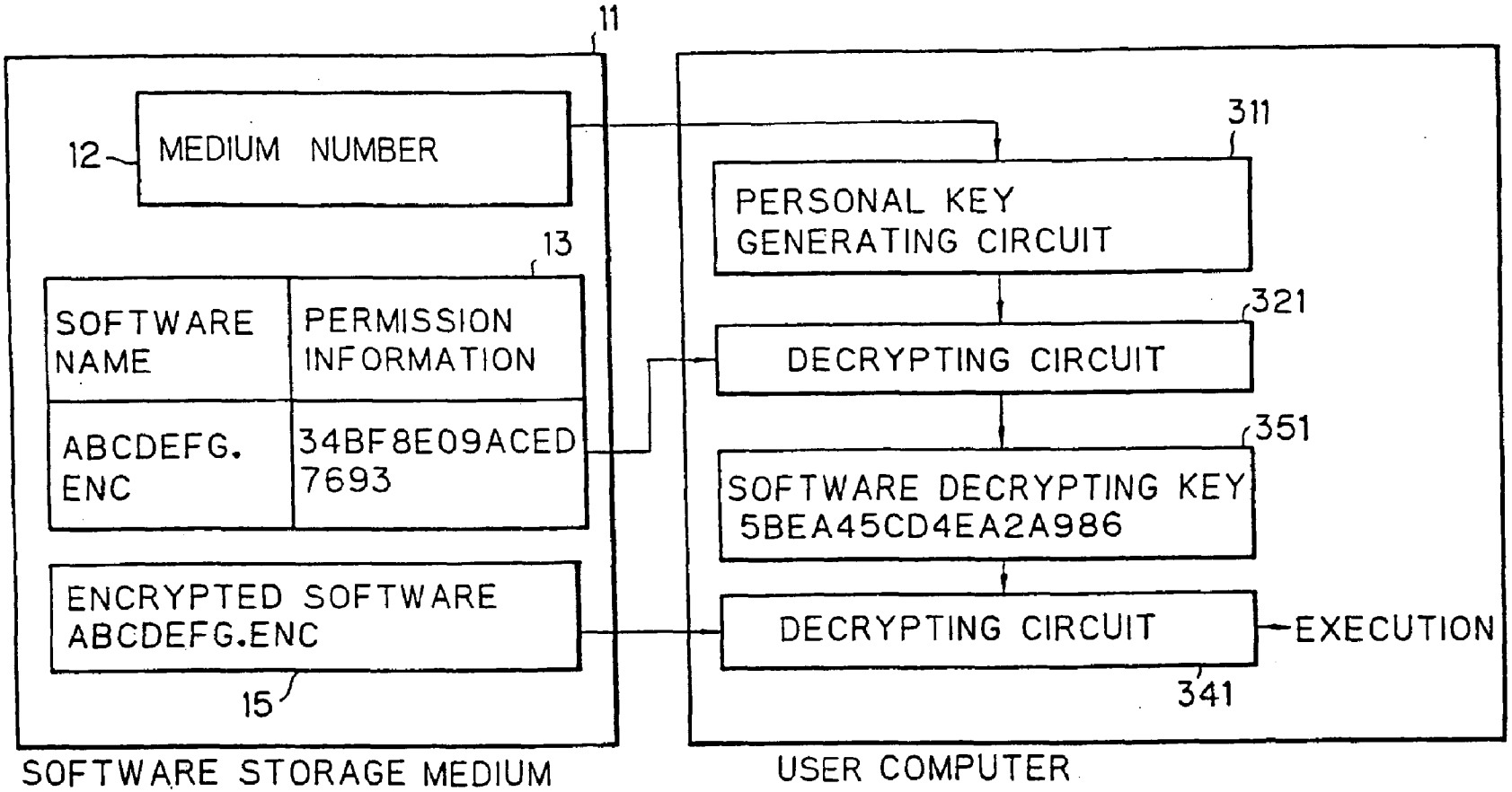

FIGS. 10A, 10B, and 10C are explanatory views of a program as electronic data. FIG. 10A shows an entire structure, FIG. 10B shows a flowchart, and FIG. 10C is an explanatory view of execution of the software. In FIG. 10A, an optical magnetic disk 6 corresponds to the software storage medium 11 of FIGS. 2 and 3, and stores the medium number 12, the permission information 13 and the encrypted program 16. The user buys the optical magnetic disk 6 and mounts this disk in an optical magnetic apparatus. As other examples, an optical disk, a CD-ROM, a floppy disk, a hard disk, a magnetic tape, a cassette tape, and the like are known as storage media.

A program loader 61 has a function of a key generating process (personal key generating process 31) and a decrypting process (decrypting process 32 and 34), and loads the corresponding decrypted program from the optical magnetic disk 6 into a main storage 63 in an execution stage of the program instruction so that the execution state of the program is established. The main storage 63 is formed by a RAM to expand the plain text program which is taken from the optical magnetic disk 6.

In FIG. 10B, in step S31, the program loader 61 receives the execution instruction for the program. In step S32, the program loader 61 loads a program to be executed and decrypts it. In step S33, the plain text program is expanded in the main memory to obtain an executable plain text program. In step S34, the plain text program in the main memory is executed.

In FIG. 10C, a relationship between the software storage medium and the user computer is explained in detail.

(1) The user computer takes the medium number 12 from the software storage medium 11, and sends it to the personal key generating circuit 311 to generate the encrypted medium key (see, step S23 of FIG. 9).

(2) The decrypting circuit 321 receives the permission information 13 from the software storage medium 13, and encrypts it based on the medium key from the generating circuit 311. As a result, the software decrypting key 351 (corresponding to the software decrypting key 35) is obtained by the decrypting circuit 321.

(3) The decrypting circuit 341 receives the encrypted software 15 from the software storage medium 11, and decrypts it based on the software decrypting key 351 to generate the plain text program, then the plain text program is stored in the main storage 63.

As explained above, it is impossible to decrypt the encrypted software 15 in which the permission information 13 is not stored so that it is impossible to execute such a program. Further, if the software storage medium 11 is illegally copied by a third party, since the medium number 12 is not provided or is different, it is impossible to decrypt the correct software decrypting key 351 from the permission information 13. As a result, it is impossible to decrypt the encrypted program so that it is impossible to execute the program. As explained above, in the user computer, an algorithm and a secret key in the personal key generating circuit 311, a software decoding key, and the plain text software are protected by a known safety means.

Figure 11A:
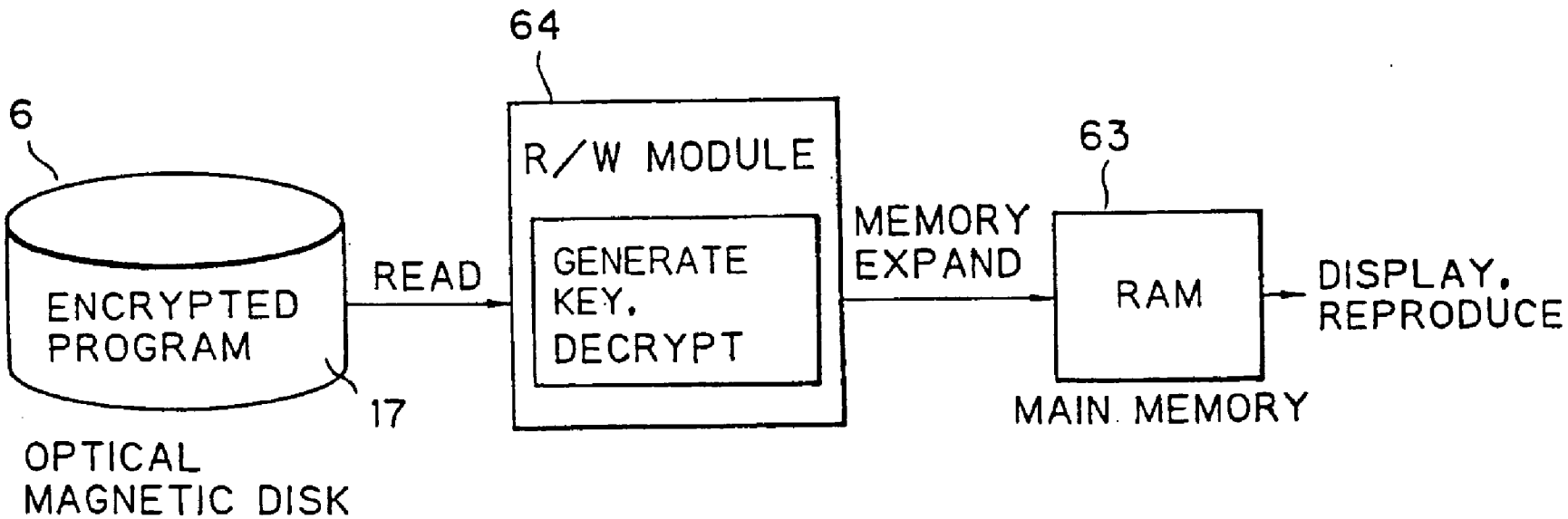
FIG. 11A, 11B, and 11C are explanatory views of data as electronic data.
Figure 11B:
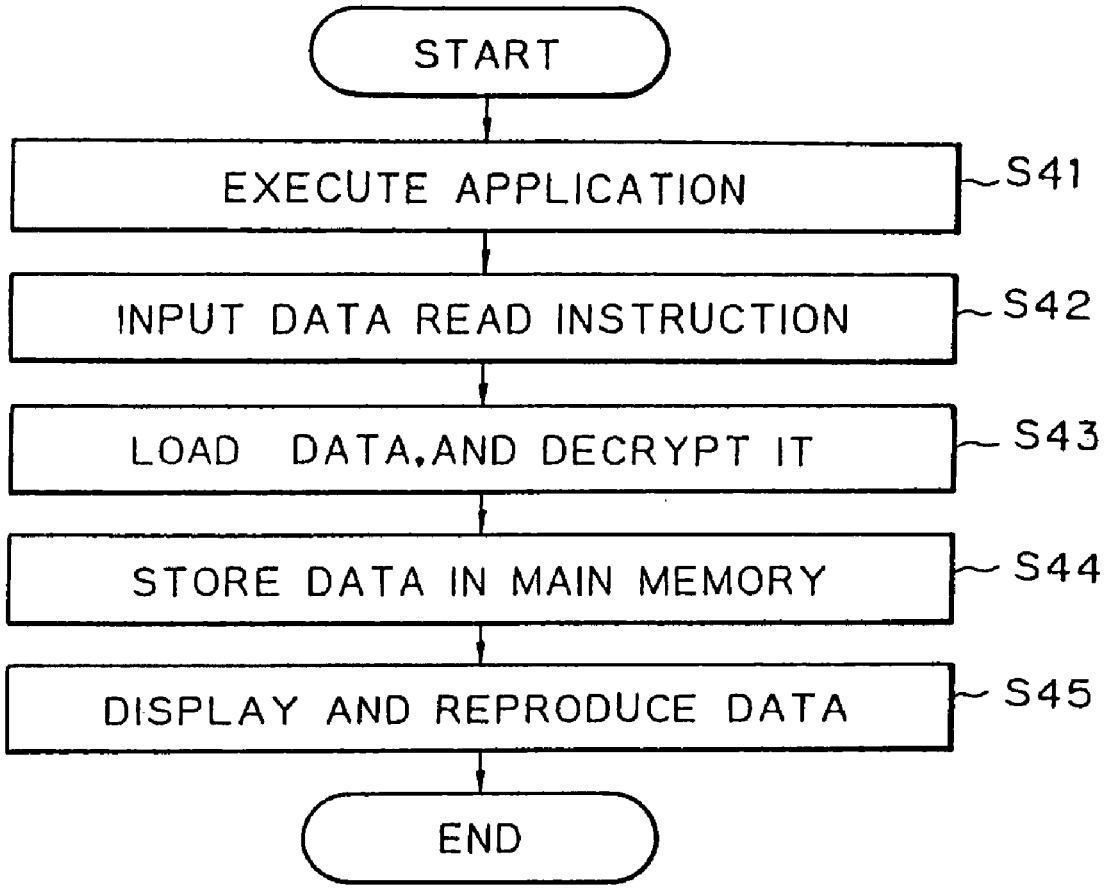
Figure 11C:
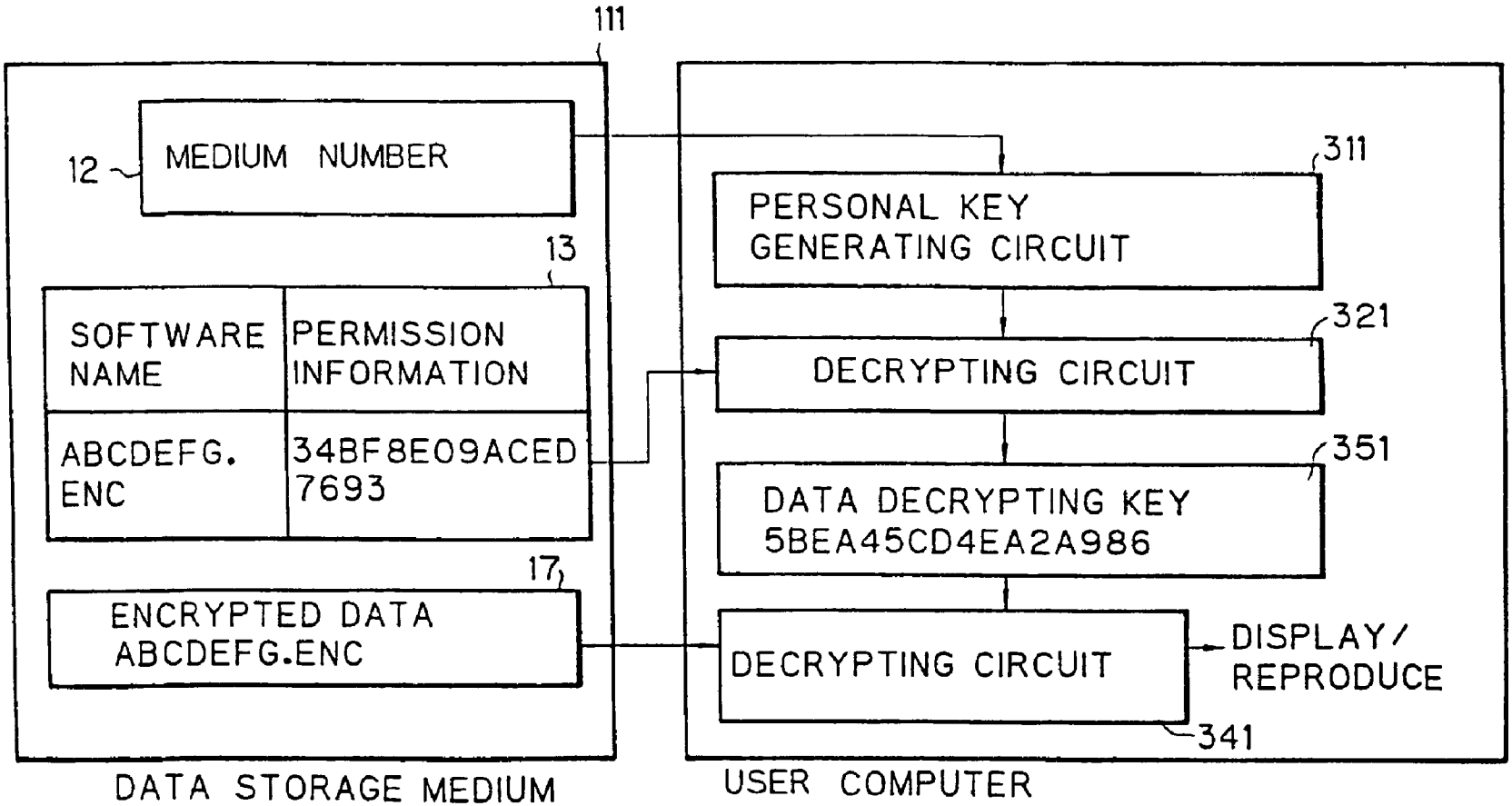

FIG. 11A, 11B, and 11C are explanatory views for electronic data, for example, character data (text), symbols, image data, and sound data. FIG. 11A shows an entire structure, FIG. 11B shows a flowchart, and FIG. 11C is an explanatory view showing execution of the software.

In FIG. 11A, an optical magnetic disk 6 corresponds to the software storage medium 11 of FIGS. 2 and 3, and stores the medium number 12, the permission information 13 and the encrypted data 17. The user buys the optical magnetic disk 6 and mounts this disk in an optical magnetic apparatus. As other examples, an optical disk, a CD-ROM, a floppy disk, a hard disk, a magnetic tape, a cassette tape, and the like are known as storage media.

A read/write (R/W) module 64 has a function of a key generating process (personal key generating process 31) and a decrypting process (decrypting process 32 and 34), and stores the corresponding decrypted data from the optical magnetic disk 6 into a main storage 63 in an execution stage of the read instruction. The main storage 63 is formed by a RAM to expand the unencrypted data which is taken from the optical magnetic disk 6.

In FIG. 11B, in step S41, the R/W module 64 executes an application program. In step S42, the R/W module 64 reads the data from the optical magnetic disk. In step S43, the R/W module takes the data and encrypts it. In step S44, the unencrypted data is stored in the main memory 63. In step 45, the data is displayed and reproduced.

In FIG. 11C, a relationship between the data storage medium and the user computer is explained in detail.

(1) The user computer takes the medium number 12 from the data storage medium 111, and sends it to the personal key generating circuit 311 to generate the encrypted medium key (see, step S23 of FIG. 9).

(2) The decrypting circuit 321 receives the permission information 13 from the data storage medium 111, and encrypts it based on the medium key from the generating circuit 311. As a result, the data decrypting key 352 (corresponding to the software decrypting key 35) is obtained by the decrypting circuit 321.

(3) The decrypting circuit 341 receives the encrypted data 15 from the data storage medium 111, and decrypts it based on the data decrypting key 351 to generate the unencrypted data, then the unencrypted data is stored in the main storage 63.

Figure 12:
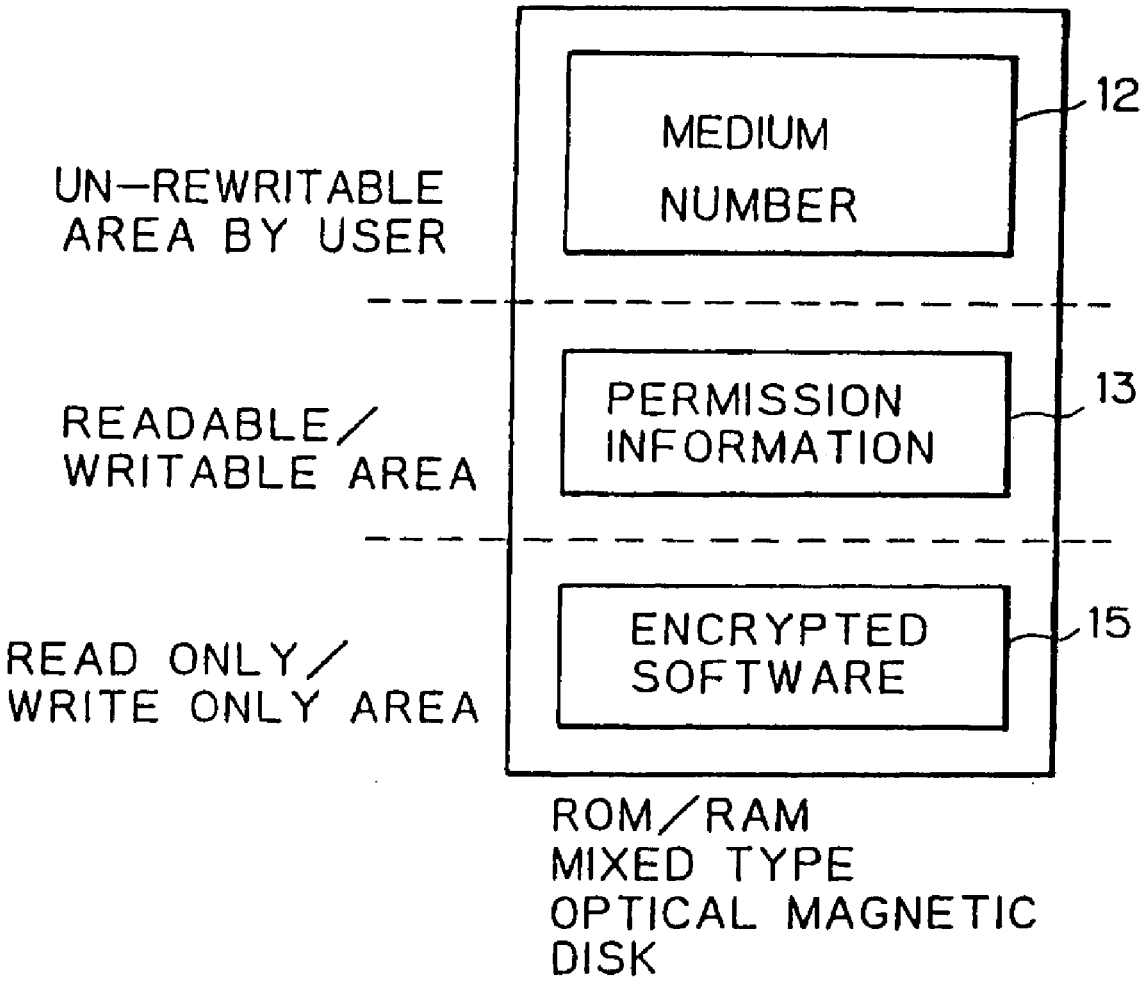
FIG. 12 is an explanatory view of a ROM/RAM mixed type optical magnetic disk.

FIG. 12 is an explanatory view of a ROM/RAM mixed type optical magnetic disk. The ROM/RAM mixed type optical magnetic disk has un-rewritable area for storing the medium number 12, and has a readable/writable area for the permission information 13, and a read only area/write only area for the encrypted software 15. In the present invention, the medium number is given to the optical magnetic disk to write the medium number into the un-rewritable area.

Figure 13:
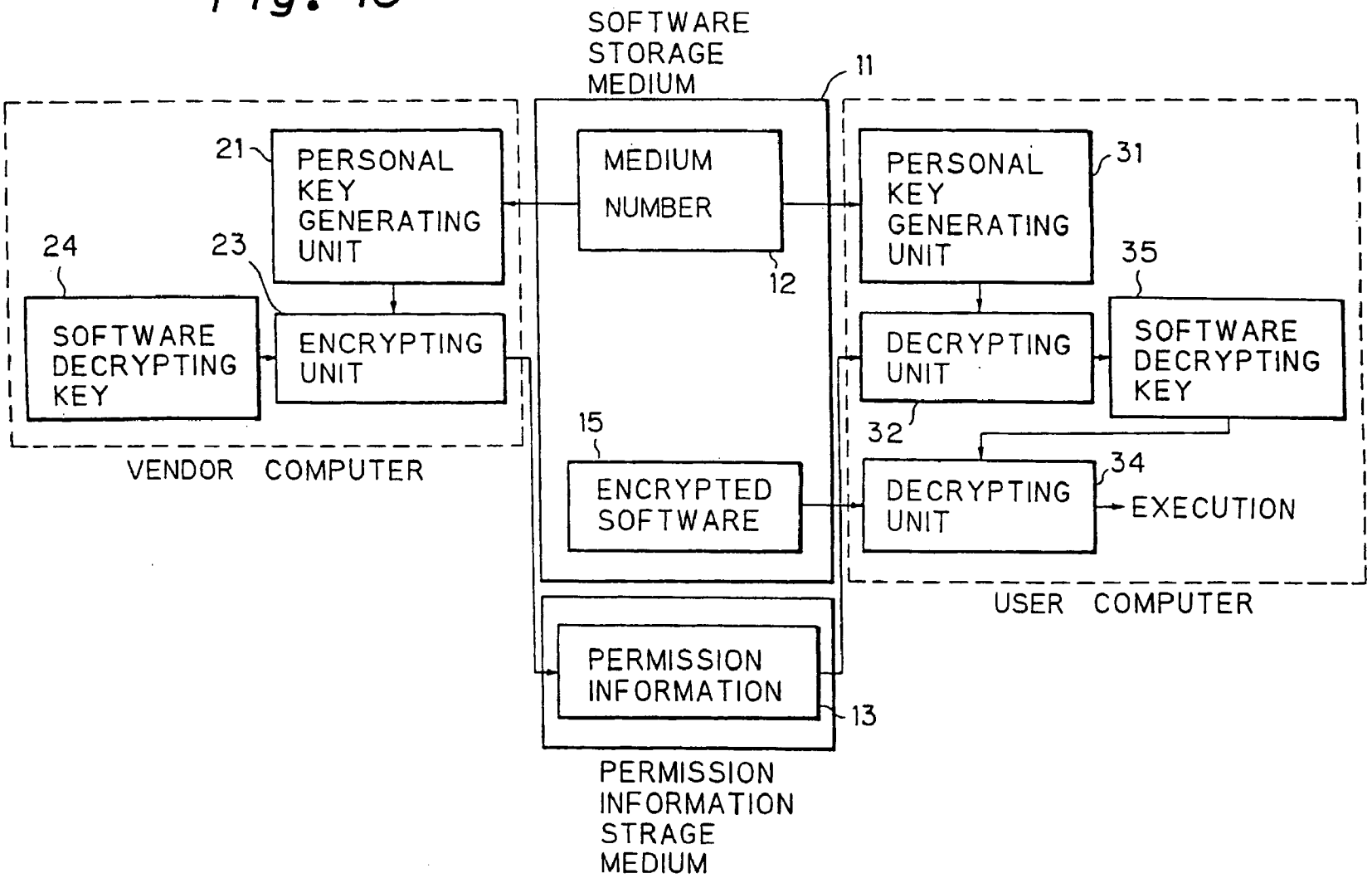
FIG. 13 is an explanatory view for permission information stored in another storage medium.

FIG. 13 is an explanatory view of the permission information stored in another storage medium. In this case, the software storage medium previously stores the medium number and the encrypted software. The permission information is stored into another storage medium. This means that them medium number and the encrypted software (or, encrypted data) are previously written onto, for example, the CD-ROM which has no write area, and the permission information is previously written onto a floppy disk.

Figure 14:
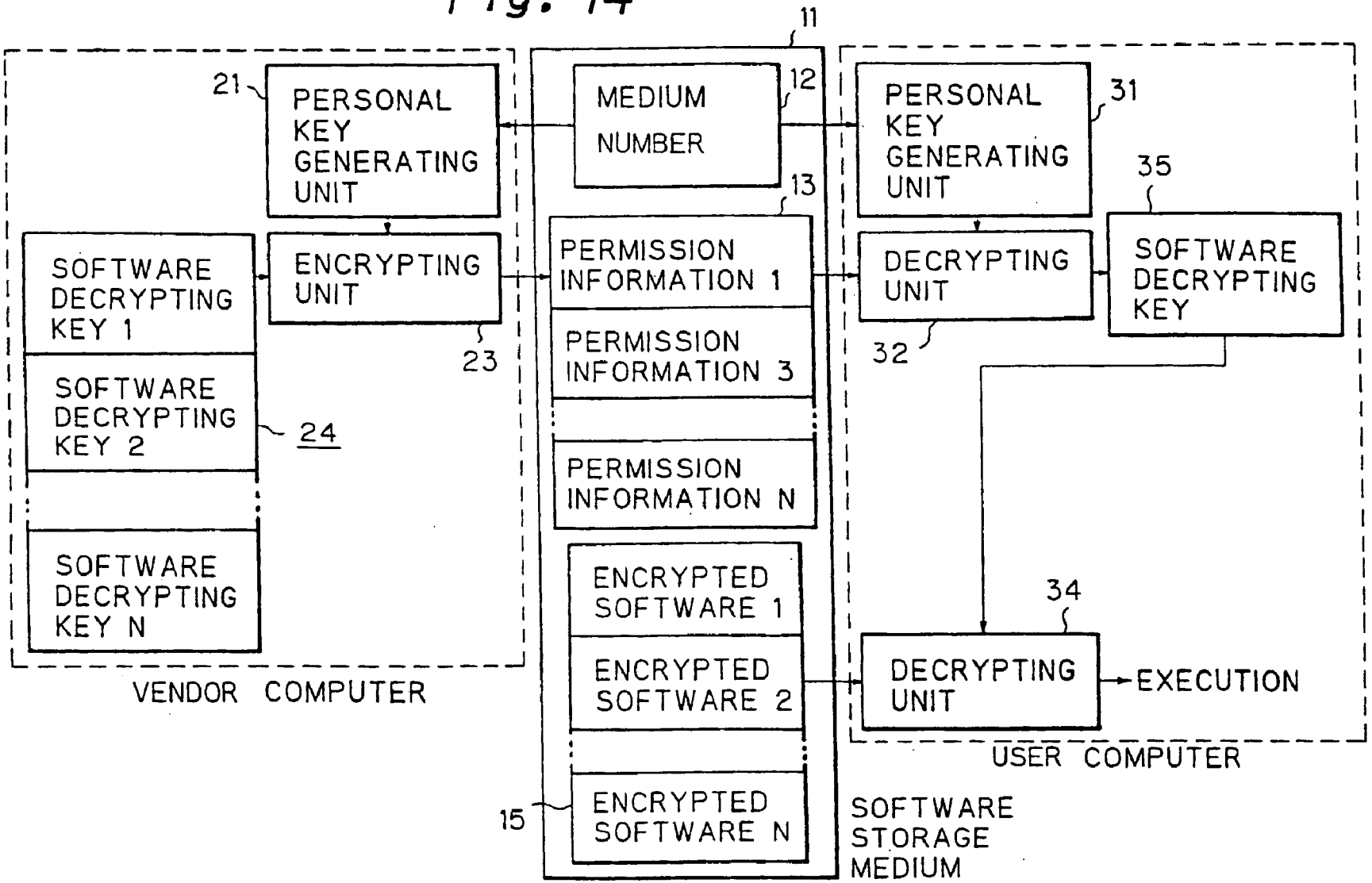
FIG. 14 is an explanatory view of multiple software written on one storage medium.

FIG. 14 is an explanatory view of multiple of software written onto one storage medium, for example, an optical disk and a CD-ROM. At the vendor, the encrypting circuit encrypts a plurality of software decrypting keys 1 to N based on the personal key to generate a plurality of permission information 1 to N each corresponding to each software decrypting key 1 to N. A plurality of permission information 1 to N is stored on the software storage medium.

When the user requests a desired software name

Even if a user tries to use software for which he has no permission number, he cannot use such software because the encrypted software cannot be decrypted. Further, even if the user copies the permission information from another software storage medium 11, the medium number in the software storage medium cannot be copies so that is it impossible to decrypt the software correctly. Accordingly, it is possible to individually sell the software.

As explained above, according to the present invention, the medium number 12 is stored on the storage medium 1 which stores the encrypted electronic data in the un-rewritable form, and permission to use the electronic data is given by the medium key 12. Accordingly, it is possible to use only the encrypted electronic data stored in correct medium 1 as authorized by the vendor so that it is possible to prevent illegal copying by a third party. Further, it is possible to transfer the electronic data stored in the storage medium 1. Still further, it is possible to use the same storage medium in another computer. Still further, it is possible to store a plurality of electronic data in one medium. Still further, it is possible to individually sell the storage medium.

We claim:

1. A storage medium accessed by a vendor computer and user computer, said storage medium for storing information readable by said user computer, said storage medium comprising:

encrypted electronic data *to be decrypted by the user computer*; [and]

a medium personal number which is [unique for each storage medium] *particularly personal for each storage medium and is different from a medium personal number of another storage medium*, wherein at least the medium personal number is written onto the storage medium in an un-writable form which said user computer cannot rewrite, and said medium personal number is used for generating a decryption key for decrypting said encrypted electronic data in said user computer*; and*

*permission information which includes the decryption key encrypted in a manner that is generated independent from a specific apparatus number for a specific computer, and generated based upon said medium personal number, said permission information and said medium personal number enabling the user computer to decrypt the encrypted decryption key and to decrypt the encrypted electronic data in a manner that the user computer does not use the specific apparatus number for the specific computer in decrypting the encrypted decryption key and the encrypted electronic data*.

2. A storage medium as claimed in claim 1, wherein the electronic data is software used for a computer.

3. A storage medium as claimed in claim 1, wherein the electronic data is electronically published data.

4. A storage medium as claimed in claim 1, wherein the storage medium is an optical magnetic disk, or a partially embossed optical disk.

5. A storage medium as claimed in claim 1, wherein the storage medium is a CD-ROM.

6. A storage medium accessed by a vendor computer and user computer, said storage medium for storing information readable by said user computer, said storage medium comprising:

encrypted electronic data *to be decrypted by the user computer*; [and]

a medium personal number which is [unique for each storage medium] *particularly personal for each storage medium and is different from a medium personal number of another storage medium*, wherein at least the medium personal number is written onto the storage medium in an un-rewritable form which said user computer cannot rewrite, and said medium personal number is used for generating an encrypted permission information in said vendor computer*; and*

*permission information encrypted in a manner that is generated independent from a specific apparatus number for a specific computer and generated based upon said medium personal number, wherein the permission information and said medium personal number enabling the user computer to decrypt the encrypted permission information and to decrypt the encrypted electronic data in a manner that the user computer does not use the specific apparatus number for the specific computer in decrypting the encrypted permission information and the encrypted electronic data*.

7. A storage medium as claimed in claim 6, wherein the electronic data is software used for a computer.

8. A storage medium as claimed in claim 6, wherein the electronic data is electronically published data.

9. A storage medium as claimed in claim 6, wherein the storage medium is an optical magnetic disk, or a partially embossed optical disk.

10. A storage medium as claimed in claim 6, wherein the storage medium is a CD-ROM.

11. A storage medium accessed by a vendor computer and a user computer, said storage medium for storing information readable by said user computer, said storage medium comprising:

encrypted electronic data *to be decrypted by the user computer*;

a medium personal number which is [unique for each storage medium] *particularly personal for each storage medium and is different from a medium personal number of another storage medium;* and encrypted permission information[,] *that is generated independent from a specific apparatus number for a specific computer and generated based upon said medium personal number;* wherein at least the medium personal number is written onto the storage medium in an unrewritable form which a user computer cannot rewrite*, and wherein said encrypted permission information and said medium personal number enabling the user computer to decrypt the encrypted permission information and to decrypt the encrypted electronic data in a manner that the user computer does not use the specific apparatus number for the specific computer in decrypting the encrypted permission information and the encrypted electronic data*.

12. A storage medium as claimed in claim 11, wherein the electronic data is software used for a computer.

13. A storage medium as claimed in claim 11, wherein the electronic data is electrically published data.

14. A storage medium as claimed in claim 11, wherein the storage medium stores a plurality of encrypted electronic data, and each encrypted electronic data has a different electronic data decrypting key.

15. A storage medium as claimed in claim 11, wherein the storage medium is an optical magnetic disk, or a partially embossed optical disk.

16. A storage medium as claimed in claim 11, wherein the storage medium is a CD-ROM.

*17. A storage medium accessed by a vendor computer and user computer, said storage medium for storing information readable by said user computer, said storage medium comprising:*

*a medium personal number which is particularly personal for each storage medium and is different from a medium personal number of another storage medium, wherein the medium personal number is written onto the storage medium in an un-rewritable form which a user storage reading apparatus cannot rewrite;*

*encrypted electronic data to be decrypted by the user computer; and*

*information which is encrypted based on said medium personal number and is encrypted independent from a specific apparatus number for a specific computer and said medium personal number is used for generating a decryption key, said decryption key and said medium personal number enabling said user computer to decrypt said encrypted electronic data in a manner that the user computer does not use the specific apparatus number for the specific computer in decrypting the encrypted electronic data.*

*18. A storage medium accessed by a vendor computer and user computer, said storage medium for storing information readable by said user computer, said storage medium comprising:*

*encrypted electronic data to be decrypted by the user computer;*

*a medium personal number which is particularly personal for each storage medium and is different from a medium personal number of another storage medium;*

*wherein at least the medium personal number is written onto the storage medium in an un-rewritable form which the user storage reading apparatus cannot rewrite, and said medium personal number is used for decrypting said encrypted electronic data; and*

*information which is encrypted based on said medium personal number and is encrypted independent from a specific apparatus number for a specific computer, said information and said medium personal number enabling said user computer to decrypt the encrypted electronic data in a manner that the user computer does not use the specific apparatus number for the specific computer in decrypting the encrypted electronic data.*

*19. A storage medium accessible from a first computer which encrypts a decryption key based upon a medium personal number and independent from a specific apparatus number for a specific first computer and which stores the encrypted decryption key onto the storage medium, and accessible from a plurality of second computers which decrypt the encrypted decryption key stored on the storage medium based upon the medium personal number and independent from a specific apparatus number for a specific second computer and which decrypt encrypted electronic data stored on the storage medium based upon the decryption key that has been decrypted based on the medium personal number and independent from the specific apparatus number for the specific second computer, the storage medium comprising:*

*a first storage area for storing encrypted electronic data to be decrypted by the second computer, the encrypted electronic data including electronic data encrypted based upon the decryption key;*

*a second storage area for storing the medium personal number, which is un-rewritable from at least the second computers, wherein the medium personal number is particularly personal for each storage medium and is different from a medium personal number of another storage medium; and*

*a third storage area for storing the encrypted decryption key, wherein the encrypted decryption key is generated based upon the medium personal number and the encrypted decryption key is generated independent from the specific apparatus number for the specific first computer,*

*wherein the encrypted decryption key in the third storage area and said medium personal number enables the second computer to decrypt the encrypted electronic data in the first storage area in a manner that the second computer does not use the specific apparatus number for the specific first computer in decrypting the encrypted electronic data.*

*20. The storage medium of claim 19, wherein the electronic information is software used for a computer.*

*21. The storage medium of claim 19, wherein the electronic information is electronically published information.*

*22. The storage medium of claim 19, wherein the storage medium is a read-only optical disk.*

*23. A storage medium accessible from a first computer which encrypts a decryption key based upon a medium personal number and independent from a specific apparatus number for a specific first computer and which stores the encrypted decryption key onto the storage medium and which encrypts electronic data based upon the decryption key and which stores the encrypted electronic data onto the storage medium, and accessible from a plurality of second computers which decrypt the encrypted decryption key stored on the storage medium based upon the medium personal number and independent from a specific apparatus number for a specific second computer and which decrypt encrypted electronic data stored on the storage medium based upon the encrypted decryption key that has been decrypted based on the medium personal number and independent from the specific apparatus number for the specific second computer, the storage medium comprising:*

*a first storage area for storing encrypted electronic data to be decrypted by the second computer, the encrypted electronic data includes electronic data encrypted based upon the decryption key;*

*a second storage area for storing the medium personal number, which is un-rewritable from at least the second computers, wherein the medium personal number is particularly personal for each storage medium and is different from a medium personal number of another storage medium; and*

*a third storage area for storing the encrypted decryption key, wherein the encrypted decryption key is generated based upon the medium personal number and the encrypted decryption key is generated independent from the specific apparatus number for the specific first computer,*

*wherein the encrypted decryption key in the third storage area and said medium personal number enables the second computer to decrypt the encrypted electronic data in the first storage area in a manner that the second computer does not use the specific apparatus number for the specific first computer in decrypting the encrypted electronic data.*

*24. A storage medium accessible from a first computer which encrypts a decryption key based upon a medium personal number and independent from a specific apparatus number for a specific computer and which stores the encrypted decryption key onto the storage medium, the storage medium comprising:*

*a first storage area for storing encrypted electronic data to be decrypted by a user computer, the encrypted electronic data including electronic data encrypted based upon the decryption key;*

*a second storage area for storing the medium personal number, which is un-rewritable, wherein the medium personal number is particularly personal for each storage medium and is different from a medium personal number of another storage medium; and*

*a third storage area for storing the encrypted decryption key, wherein the encrypted decryption key is generated based upon the medium personal number and the encrypted decryption key is generated independent from a specific apparatus number for a specific computer,*

*wherein the encrypted decryption key in the third storage area and said medium personal number enables the user computer to decrypt the encrypted electronic data in the first storage area in a manner that the user computer does not use the specific apparatus number*

*for the specific first computer in decrypting the encrypted electronic data.*

*25. A storage medium accessible from a first computer which encrypts a decryption key based upon a medium personal number and independent from a specific apparatus number for a specific computer and which stores the encrypted decryption key onto the storage medium and which encrypts electronic data based upon the encrypted decryption key and which stores the encrypted electronic data onto the storage medium, the storage medium comprising:*

*a first storage area for storing encrypted electronic data to be decrypted by a user computer, the encrypted electronic data including electronic data encrypted based upon the decryption key;*

*a second storage area for storing the medium personal number, which is un-rewritable, wherein the medium personal number is particularly personal for each storage medium and is different from a medium personal number of another storage medium; and*

*a third storage area for storing the encrypted decryption key, wherein the encrypted decryption key is generated based upon the medium personal number and the encrypted decryption key is generated independent from a specific apparatus number for a specific computer,*

*wherein the encrypted decryption key in the third storage area and said medium personal number enables the user computer to decrypt the encrypted electronic data in the first storage area in a manner that the user computer does not use the specific apparatus number for the specific first computer in decrypting the encrypted electronic data.*

*26. A storage medium accessible from a plurality of computers which decrypt an encrypted decryption key stored on the storage medium, the encrypted decryption key being based upon a medium personal number and independent from a specific apparatus number for a specific computer, and which decrypt encrypted electronic data stored on the storage medium based upon the decryption key that has been decrypted based on the medium personal number and independent from the specific apparatus number for the specific computer, the storage medium comprising:*

*a first storage area for storing encrypted electronic data to be decrypted by a user computer, the encrypted electronic data including electronic data encrypted based upon the decryption key;*

*a second storage area for storing the medium personal number, which is un-rewritable, wherein the medium personal number is particularly personal for each storage medium and is different from a medium personal number of another storage medium; and*

*a third storage area for storing an encrypted decryption key, wherein the encrypted decryption key is generated based upon the medium personal number and the encrypted decryption key is generated independent from the specific apparatus number for the specific computer,*

*wherein the encrypted decryption key in the third storage area and said medium personal number enables the user computer to decrypt the encrypted electronic data in the first storage area in a manner that the user computer does not use the specific apparatus number for the specific first computer in decrypting the encrypted electronic data.*

*27. A storage medium accessible from a vendor computer and a user computer at different times, the storage medium comprising:*

*a first storage area for storing encrypted electronic data to be decrypted by the user computer, the encrypted electronic data including electronic data encrypted based upon a decryption key;*

*a second storage area for storing a medium personal number, which is un-rewritable from the computers, wherein the medium personal number is particularly personal for each storage medium and is different from a medium personal number of another storage medium; and*

*a third storage area for storing the encrypted decryption key, wherein the encrypted decryption key is generated based upon the medium personal number and the encrypted decryption key is generated independent from a specific apparatus number for a specific computer,*

*wherein the encrypted decryption key in the third storage area and said medium personal number enables the user computer to decrypt the encrypted electronic data in the first storage area in a manner that the user computer does not use the specific apparatus number for the specific first computer in decrypting the encrypted electronic data.*

*28. A storage medium accessed by a vendor computer and a user computer, said storage medium comprising:*

*a first storage area for storing encrypted electronic data to be decrypted by the user computer, the encrypted electronic data including electronic data encrypted based upon a decryption key;*

*a second storage area for storing a medium personal number, which is un-rewritable, wherein the medium personal number is particularly personal for each storage medium and is different from a medium personal number of another storage medium; and*

*a third storage area for storing an encrypted decryption key, wherein the encrypted decryption key is generated based upon the medium personal number and the encrypted decryption key is generated independent from a specific apparatus number for a specific computer,*

*wherein the encrypted decryption key in the third storage area and said medium personal number enables the user computer to decrypt the encrypted electronic data in the first storage area in a manner that the user computer does not use the specific apparatus number for the specific first computer in decrypting the encrypted electronic data.*

*29. A storage medium accessible from a first computer which encrypts a decryption key based upon a medium personal number and independent from a specific apparatus number for a specific first computer and which stores the encrypted decryption key onto the storage medium, and accessible from a plurality of second computers which decrypt the encrypted decryption key stored on the storage medium based upon the medium personal number and independent from a specific apparatus number for a specific second computer and which decrypt encrypted electronic data stored on the storage medium based upon the decryption key that has been decrypted based on the medium personal number and independent from the specific apparatus number for the specific second computer, the storage medium comprising:*

*a storage area for storing the medium personal number, which is un-rewritable from at least the second computers, wherein the medium personal number is particularly personal for each storage medium and is*

*different from a medium personal number of another storage medium; and*

*a storage area for storing encrypted electronic data to be decrypted by the second computer and the encrypted decryption key, wherein the encrypted decryption key is generated based upon the medium personal number and the encrypted decryption key is generated independent from the specific apparatus number for the specific first computer, and wherein the encrypted decryption key and said medium personal number enables the second computer to decrypt the encrypted electronic data in a manner that the second computer does not use the specific apparatus number for the specific first computer in decrypting the encrypted electronic data.*

*30. The storage medium of claim 29, wherein the electronic information is software used for a computer.*

*31. The storage medium of claim 29, wherein the electronic information is electronically published information.*

*32. The storage medium of claim 29, wherein the storage medium is a read-only optical disk.*

*33. A storage medium accessible from a first computer which encrypts a decryption key based upon a medium personal number and independent from a specific apparatus number for a specific first computer and which stores the encrypted decryption key onto the storage medium and which encrypts electronic data to be decrypted by a specific second computer based upon the decryption key and which stores the encrypted electronic data onto the storage medium, and accessible from a plurality of second computers which decrypt the encrypted decryption key stored on the storage medium based upon the medium personal number and independent from a specific apparatus number for the specific second computer and which decrypt encrypted electronic data stored on the storage medium based upon the decryption key that has been decrypted based on the medium personal number and independent from the specific apparatus number for the specific second computer, the storage medium comprising:*

*a storage area for storing the medium personal number, which is un-rewritable from at least the second computers, wherein the medium personal number is particularly personal for each storage medium and is different from a medium personal number of another storage medium; and*

*a storage area for storing encrypted electronic data and the encrypted decryption key, wherein the encrypted decryption key is generated based upon the medium personal number and the encrypted decryption key is generated independent from the specific apparatus number for the specific second computer, and wherein the encrypted decryption key and said medium personal number enables the second computer to decrypt the encrypted electronic data in a manner that the second computer does not use the specific apparatus number for the specific second computer in decrypting the encrypted electronic data.*

*34. A storage medium accessible from a first computer which encrypts a decryption key based upon a medium personal number and independent from a specific apparatus number for a specific computer and which stores the encrypted decryption key onto the storage medium, the storage medium comprising:*

*a storage area for storing the medium personal number, which is un-rewritable, wherein the medium personal number is particularly personal for each storage medium and is different from a medium personal number of another storage medium;*

*a storage area for storing the encrypted decryption key, wherein the encrypted decryption key is generated based upon the medium personal number and the encrypted decryption key is generated independent from the specific apparatus number for the specific computer; and*

*a storage area for storing encrypted electronic data to be decrypted by a user computer which is accessible after the decryption key has been decrypted, wherein said decryption key and said medium personal number enables the user computer to decrypt the encrypted electronic data in a manner that the user computer does not use the specific apparatus number for the specific computer in decrypting the encrypted electronic data.*

*35. A storage medium accessible from a first computer which encrypts a decryption key based upon a medium personal number and independent from a specific apparatus number for a specific computer and which stores the encrypted decryption key onto the storage medium and which encrypts electronic data to be decrypted by a user computer based upon the decryption key and which stores the encrypted electronic data onto the storage medium, the storage medium comprising:*

*a storage area for storing the medium personal number, which is un-rewritable, wherein the medium personal number is particularly personal for each storage medium and is different from a medium personal number of another storage medium; and*

*a storage area for storing encrypted electronic data and the encrypted decryption key, wherein the encrypted decryption key is generated based upon the medium personal number and the encrypted decryption key is generated independent from the specific apparatus number for the specific computer, and wherein the encrypted decryption key and said medium personal number enables the user computer to decrypt the encrypted electronic data in a manner that the user computer does not use the specific apparatus number for the specific first computer in decrypting the encrypted electronic data.*

*36. A storage medium accessible from a plurality of computers which decrypt an encrypted decryption key stored on the storage medium, the encrypted decryption key being based upon a medium personal number and independent from a specific apparatus number for a specific computer and which enables a user computer to decrypt encrypted electronic data stored on the storage medium based upon the decryption key that has been decrypted based on the medium personal number and independent from the specific apparatus number for the specific computer in a particular computer, the storage medium comprising:*

*a storage area for storing the medium personal number, which is un-rewritable from the computers, wherein the medium personal number is particularly personal for each storage medium and is different from a medium personal number of another storage medium;*

*a storage area for storing the encrypted decryption key, wherein the encrypted decryption key is generated based upon the medium personal number and the encrypted decryption key is generated independent from the specific apparatus number for the specific computer; and*

*a storage area for storing encrypted electronic data which is accessible after the decryption key has been decrypted, wherein said decryption key and said medium personal number enables the user computer to*

*decrypt the encrypted electronic data in a manner that the user computer does not use the specific apparatus number for the specific first computer in decrypting the encrypted electronic data.*

*37. A storage medium accessible from a vendor computer and a user computer at different times, the storage medium comprising:*

*a storage area for storing a medium personal number, which is un-rewritable from the computers, wherein the medium personal number is particularly personal for each storage medium and is different from a medium personal number of another storage medium;*

*a storage area for storing an encrypted decryption key, wherein the encrypted decryption key is generated based upon the medium personal number and the encrypted decryption key is generated independent from a specific apparatus number for a specific computer; and*

*a storage area for storing encrypted electronic data to be decrypted by the user computer which is accessible after the decryption key has been decrypted, wherein said decryption key and said medium personal number enables the user computer to decrypt the encrypted electronic data in a manner that the user computer does not use the specific apparatus number for the specific first computer in decrypting the encrypted electronic data.*

*38. A storage medium accessed by a vendor computer and a user computer, said storage medium comprising:*

*a storage area for storing a medium personal number, which is un-rewritable, wherein the medium personal number is particularly personal for each storage medium and is different from a medium personal number of another storage medium;*

*a storage area for storing an encrypted decryption key, wherein the encrypted decryption key is generated based upon the medium personal number and the encrypted decryption key is generated independent from a specific apparatus number for a specific computer; and*

*a storage area for storing encrypted electronic data to be decrypted by the user computer which is accessible after the decryption key has been decrypted, wherein said decryption key and said medium personal number enables the user computer to decrypt the encrypted electronic data in a manner that the user computer does not use the specific apparatus number for the specific first computer in decrypting the encrypted electronic data.*

*39. A storage medium accessible from a first computer which encrypts a decryption key based upon a medium personal number and independent from a specific apparatus number for a specific first computer and which stores the encrypted decryption key onto the storage medium, and accessible from a plurality of second computers which decrypt the encrypted decryption key stored on the storage medium based upon the medium personal number and independent from a specific apparatus number for a specific second computer and which decrypt encrypted electronic data stored on the storage medium based upon the decryption key that has been decrypted based on the medium personal number and independent from the specific apparatus number for the specific second computer, the storage medium comprising:*

*a storage area for storing the medium personal number, which is un-rewritable from at least the second computers, wherein the medium personal number is particularly personal for each storage medium and is different from a medium personal number of another storage medium; and*

*a storage area for storing encrypted electronic data to be decrypted by the second computer, which includes data encrypted based upon the medium personal number and encrypted independent from the specific apparatus number for the specific first computer,*

*wherein the second computer decrypts encrypted electronic data in a manner that the second computer does not use the specific apparatus number for the specific first computer in decrypting the encrypted decryption key and the encrypted electronic data.*

*40. The storage medium of claim 39, wherein the electronic information is software used for a computer.*

*41. The storage medium of claim 39, wherein the electronic information is electronically published information.*

*42. The storage medium of claim 39, wherein the storage medium is a read-only optical disk.*

*43. A storage medium accessible from a first computer which encrypts a decryption key based upon a medium personal number and independent from a specific apparatus number for a specific first computer and which stores the encrypted decryption key onto the storage medium and which encrypts electronic data based upon the decryption key and which stores the encrypted electronic data onto the storage medium, and accessible from a plurality of second computers which decrypt the encrypted decryption key stored on the storage medium based upon the medium personal number and independent from a specific apparatus number for a specific second computer and which decrypt encrypted electronic data stored on the storage medium based upon the decryption key that has been decrypted based on the medium personal number and independent from the specific apparatus number for the specific second computer, the storage medium comprising:*

*a storage area for storing the medium personal number, which is un-rewritable from at least the second computers, wherein the medium personal number is particularly personal for each storage medium and is different from a medium personal number of another storage medium; and*

*a storage area for storing encrypted electronic data to be decrypted by the second computer, which includes information encrypted based upon the medium personal number and encrypted independent from the specific apparatus number for the specific second computer,*

*wherein the second computer decrypts encrypted electronic data in a manner that the second computer does not use the specific apparatus number for the specific second computer in decrypting the encrypted electronic data.*

*44. A storage medium accessible from a vendor computer and a user computer, where the vendor computer encrypts a decryption key based upon a medium personal number and independent from a specific apparatus number for a specific computer and which stores the encrypted decryption key onto the storage medium, the storage medium comprising:*

*a storage area for storing the medium personal number, which is un-rewritable, wherein the medium personal number is particularly personal for each storage medium and is different from a medium personal number of another storage medium; and*

*a storage area for storing encrypted electronic data to be decrypted by the user computer wherein the encrypted*

*electronic data includes information encrypted based upon the medium personal number and encrypted independent from the specific apparatus number for the specific computer,*

*wherein said user computer decrypts the encrypted electronic data in a manner that the second computer does not use the specific apparatus number for the specific computer in decrypting the encryption key and the encrypted electronic data.*

*45. A storage medium accessible from a first computer which encrypts a decryption key based upon a medium personal number and independent from a specific apparatus number for a specific computer and which stores the encrypted decryption key onto the storage medium and which encrypts electronic data to be decrypted by a user computer based upon the decryption key and which stores the encrypted electronic data onto the storage medium, the storage medium comprising:*

*a storage area for storing a medium personal number, which is un-rewritable, wherein the medium personal number is particularly personal for each storage medium and is different from a medium personal number of another storage medium; and*

*a storage area for storing encrypted electronic data wherein the encrypted electronic data includes information encrypted based upon the medium personal number and encrypted independent from the specific apparatus number for the specific computer,*

*wherein the user computer decrypts the encrypted electronic data in a manner that the second computer does not use the specific apparatus number for the specific computer in decrypting the encrypted decryption key and the encrypted electronic data.*

*46. A storage medium accessible from a plurality of computers which decrypt an encrypted decryption key stored on the storage medium, the encrypted decryption key being based upon the medium personal number and independent from a specific apparatus number for a specific computer and which decrypt encrypted electronic data stored on the storage medium based upon the decryption key that has been decrypted based on the medium personal number and independent from the specific apparatus number for the specific computer in a particular computer, comprising:*

*a storage area for storing the medium personal number, which is un-rewritable from the computers, wherein the medium personal number is particularly personal for each storage medium and is different from a medium personal number of another storage medium; and*

*a storage area for storing encrypted electronic data to be decrypted by a user computer wherein the encrypted electronic data includes information encrypted based upon the medium personal number and encrypted independent from the specific apparatus number for the specific computer,*

*wherein the user computer decrypts encrypted electronic data in a manner that the second computer does not use the specific apparatus number for the specific computer in decrypting the encrypted decryption key and the encrypted electronic data.*

*47. A storage medium accessible from different computers at different times, the storage medium comprising:*

*a storage area for storing the medium personal number, which is un-rewritable from the computers, wherein the medium personal number is particularly personal for each storage medium and is different from a medium personal number of another storage medium;*

*a storage area for storing encrypted electronic data to be decrypted by a user computer, which includes information encrypted based upon the medium personal number and encrypted independent from a specific apparatus number for a specific computer; and*

*a storage area for storing electronic data which is accessible after the encrypted electronic data has been decrypted,*

*wherein the medium personal number enables a user computer to decrypt the encrypted electronic data in a manner that the user computer does not use the specific apparatus number for the specific computer in decrypting the encrypted decryption key encrypted electronic data.*

*48. A storage medium accessed by a vendor computer and a user computer, said storage medium comprising:*

*a storage area for storing a medium personal number, which is un-rewritable, wherein the medium personal number is particularly personal for each storage medium and is different from a medium personal number of another storage medium;*

*a storage area for storing encrypted electronic data to be decrypted by the user computer which includes information encrypted based upon the medium personal number and encrypted independent from a specific apparatus number for a specific computer; and*

*a storage area for storing electronic data which is accessible after the encrypted electronic data has been decrypted,*

*wherein the medium personal number enables the user computer to decrypt the encrypted electronic data in a manner that the user computer does not use the specific apparatus number for the specific computer in decrypting the encrypted decryption key and the encrypted electronic data.*

*49. A storage medium accessed by a vendor computer and a user computer in a manner such that a decryption key is encrypted based upon a medium personal number and independent from a specific apparatus number for a specific computer and the encrypted decryption key is stored onto the storage medium, and accessed in a manner such that the encrypted decryption key stored on the storage medium is decrypted based upon the medium personal number and independent from the specific apparatus number for the specific computer and that encrypted electronic data stored on the storage medium is decrypted based upon the decryption key that has been decrypted based on the medium personal number and independent from the specific apparatus number for the specific computer, the storage medium comprising:*

*a storage area for storing the medium personal number, which is un-rewritable, wherein the medium personal number is particularly personal for each storage medium and is different from a medium personal number of another storage medium; and*

*a storage area for storing encrypted electronic data to be decrypted by the user computer, wherein the encrypted electronic data includes information encrypted based upon the medium personal number and encrypted independent from the specific apparatus number for the specific computer,*

*wherein the decryption key and said medium personal number enables the user computer to decrypt the encrypted electronic data in a manner that the user computer does not use the specific apparatus number for the specific computer in decrypting the encrypted electronic data.*

*50. The storage medium of claim 49, wherein the electronic information is software used for a computer.*

*51. The storage medium of claim 49, wherein the electronic information is electronically published information.*

*52. The storage medium of claim 49, wherein the storage medium is a read-only optical disk.*

*53. A storage medium accessed by a vendor computer and a user computer in a manner such that a decryption key is encrypted based upon a medium personal number and independent from a specific apparatus number for a specific computer and the encrypted decryption key is stored onto the storage medium and that electronic data is encrypted based upon the decryption key and the encrypted electronic data is stored onto the storage medium, and accessed in a manner such that the encrypted decryption key stored on the storage medium is decrypted based upon the medium personal number and independent from the specific apparatus number for the specific computer and that the encrypted electronic information stored on the storage medium is decrypted based upon the decryption key that has been decrypted based on the medium personal number and independent from the specific apparatus number for the specific computer in a particular second computer in different time, the storage medium comprising:*

*a storage area for storing a medium personal number, which is un-rewritable, wherein the medium personal number is particularly personal for each storage medium and is different from a medium personal number of another storage medium; and*

*a storage area for storing encrypted electronic data to be decrypted by the user computer, wherein the encrypted electronic data includes information encrypted based upon the medium personal number and encrypted independent from the specific apparatus number for the specific computer,*

*wherein the decryption key and said medium personal number enables the user computer to decrypt the encrypted electronic data in a manner that the user computer does not use the specific apparatus number for the specific computer in decrypting the encrypted electronic data.*

*54. A storage medium accessed by a vendor computer and a user computer in a manner such that a decryption key is encrypted based upon a medium personal number and independent from a specific apparatus number for a specific computer and that the encrypted decryption key is stored onto the storage medium, the storage medium comprising:*

*a storage area for storing the medium personal number, which is un-rewritable, wherein the medium personal number is particularly personal for each storage medium and is different from a medium personal number of another storage medium; and*

*a storage area for storing encrypted electronic data to be decrypted by the user computer, wherein the encrypted electronic data includes information encrypted based upon the medium personal number and encrypted independent from the specific apparatus number for the specific computer,*

*wherein the decryption key and said medium personal number enables the user computer to decrypt the encrypted electronic data in a manner that the user computer does not use the specific apparatus number for the specific computer in decrypting the encrypted electronic data.*

*55. A storage medium accessed by a vendor computer and a user computer in a manner such that a decryption key is encrypted based upon a medium personal number and independent from a specific apparatus number for a specific computer and the encrypted decryption key is stored onto the storage medium and that electronic data is encrypted based upon the decryption key and the encrypted electronic data is stored onto the storage medium, the storage medium comprising:*

*a storage area for storing the medium personal number, which is un-rewritable, wherein the medium personal number is particularly personal for each storage medium and is different from a medium personal number of another storage medium; and*

*a storage area for storing encrypted electronic data to be decrypted by the user computer, wherein the encrypted electronic data includes information encrypted based upon the medium personal number and encrypted independent from the specific apparatus number for the specific computer,*

*wherein the decryption key and said medium personal number enables the user computer to decrypt the encrypted electronic data in a manner that the user computer does not use the specific apparatus number for the specific computer in decrypting the encrypted electronic data.*

*56. A storage medium accessed by a vendor computer and user computer, said storage medium for storing information readable by said user computer, said storage medium comprising:*

*an area storing encrypted electronic data to be decrypted by the user computer;*

*an area storing a medium personal number which is particularly personal for each storage medium and is different from a medium personal number of another storage medium, wherein at least the medium personal number is written onto the storage medium in an un-rewritable form which the user computer cannot change; and*

*an area storing permission information which includes a decryption key encrypted in a manner that is independent from a specific apparatus number for a specific computer and based upon said medium personal number, wherein said permission information and said medium personal number enabling the user computer to decrypt the encrypted decryption key and to decrypt the encrypted electronic data in a manner that the user computer does not use the specific apparatus number for the specific computer in decrypting the encrypted decryption key and the encrypted electronic data.*

*57. A storage medium accessed by a vendor computer and user computer, said storage medium for storing information readable by said user computer, said storage medium comprising:*

*an area storing encrypted electronic data to be decrypted by the user computer;*

*an area storing a medium personal number which is particularly personal for each storage medium and is different from a medium personal number of another storage medium, wherein at least the medium personal number is written onto the storage medium in an un-rewritable form which the user computer cannot rewrite; and*

*wherein the user computer decrypts the encrypted electronic data using permission information which is encrypted in a manner that is independent from a specific apparatus number for a specific computer and based upon said medium personal number.*

*58. A storage medium accessed by a vendor computer and user computer said storage medium for storing information readable by said user computer, said storage medium comprising:*

*an area storing encrypted electronic data to be decrypted by the user computer;*

*an area storing a medium personal number which is particularly personal for each storage medium and is different from a medium personal number of another storage medium; and*

*wherein the user computer decrypts the encrypted electronic data using permission information that is encrypted independent from a specific apparatus number for a specific computer;*

*wherein at least the medium personal number is written onto the storage medium in an un-rewritable form which a user computer cannot rewrite.*

*59. A storage medium readable by a vendor computer and a user computer, said storage medium comprising:*

*data representing a medium personal number;*

*encrypted electronic data to be decrypted by the user computer; and*

*first data that is based on the medium personal number and encrypted independent from a specific apparatus number for a specific computer, wherein the medium personal number is un-rewritable and particularly personal for each storage medium and is different from a medium personal number of another storage medium, and wherein the user computer decrypts the encrypted electronic data using the first data in a manner that the user computer does not use the specific apparatus number for the specific computer in decrypting the encrypted electronic data.*

*60. A storage medium according to claim 59, wherein the first data includes a key encrypted based on the medium personal number.*

*61. A storage medium according to claim 59, wherein the encrypted data is encrypted based on the key.*

*62. A storage medium according to claim 59, wherein the first data comprises the medium personal number.*

*63. A storage medium readable by a vendor computer and a user computer at different times, the storage medium comprising:*

*data representing a medium personal number;*

*encrypted electronic data to be decrypted by the user computer; and*

*first data that is based on the medium personal number and encrypted independent from a specific apparatus number for a specific computer, wherein the medium personal number is un-rewritable and particularly personal for each storage medium and is different from a medium personal number of another storage medium, and wherein the user computer decrypts the encrypted electronic data using the first data in a manner that the user computer does not use the specific apparatus number for the specific computer in decrypting the encrypted electronic data.*

*64. A storage medium for storing data for access and processing by a vendor computer and a user computer, said storage medium comprising:*

*a medium personal number storage area including a medium personal number which is particularly personal for each storage medium and is different from a medium personal number of another storage medium, wherein the medium personal number is written onto the storage medium in an un-rewritable form which a user storage reading apparatus cannot rewrite;*

*an electronic information storage area including encrypted electronic data to be decrypted by the user computer; and*

*the user computer decrypts the encrypted electronic data based upon an encrypted decryption key which has been encrypted based on said medium personal number and encrypted independent from a specific apparatus number for a specific computer.*

*65. A storage medium for storing data for access and processing by a vendor computer and a user computer, said storage medium comprising:*

*an encrypted electronic data storage area including encrypted electronic data to be decrypted by the user computer;*

*a medium personal number storage area including a medium personal number which is particularly personal for each storage medium and is different from a medium personal number of another storage medium;*

*wherein at least the medium personal number is written onto the storage medium in an un-rewritable form which the user storage reading apparatus cannot rewrite, and said medium personal number enables decrypting of said encrypted electronic data from the user computer; and*

*wherein the user computer decrypts the encrypted electronic data based upon information which is encrypted based on said medium personal number and encrypted independent from a specific apparatus number for a specific computer.*

* * * * *